US008141130B2

(12) United States Patent
Avram et al.

(10) Patent No.: US 8,141,130 B2
(45) Date of Patent: Mar. 20, 2012

(54) AUTOMATED DISSEMINATION OF ENTERPRISE POLICY FOR RUNTIME CUSTOMIZATION OF RESOURCE ARBITRATION

(75) Inventors: Mircea Simion Ioan Avram, Toronto (CA); Asit Dan, Pleasantville, NY (US); Daniela Rosu, Ossining, NY (US); Andrew Neil Trossman, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 12/131,358

(22) Filed: Jun. 2, 2008

(65) Prior Publication Data

US 2008/0235761 A1   Sep. 25, 2008

Related U.S. Application Data

(63) Continuation of application No. 11/170,697, filed on Jun. 29, 2005, now abandoned.

(51) Int. Cl.
*H04L 29/06* (2006.01)
(52) U.S. Cl. .......................................................... 726/1
(58) Field of Classification Search ...... 726/1; 709/226; 717/172, 177, 120, 121; 705/1, 7–9
See application file for complete search history.

(56) References Cited

U.S. PATENT DOCUMENTS

| | | | |
|---|---|---|---|
| 5,802,276 | A | 9/1998 | Benantar et al. |
| 2003/0023711 | A1* | 1/2003 | Parmar et al. ............... 709/223 |
| 2003/0149685 | A1* | 8/2003 | Trossman et al. ................ 707/2 |
| 2003/0154404 | A1* | 8/2003 | Beadles et al. ................ 713/201 |
| 2004/0176968 | A1 | 9/2004 | Syed et al. |
| 2005/0047412 | A1* | 3/2005 | Hares ........................... 370/392 |
| 2005/0251851 | A1 | 11/2005 | Patrick et al. |
| 2005/0257244 | A1* | 11/2005 | Joly et al. ......................... 726/1 |

OTHER PUBLICATIONS

William E. Walsh, et al.; "Utility Functions in Autonomic Systems", IBM T.J. Watson Research Center, Hawthorne NY; International Conference on Autonomic Computing, 2004, 8 pages.
D. Rosu, et al.; FARA—A Framework for Adaptive Resource Allocation in Complex Teal-Time Systems, IEEE Real-Time and Embedded Technology And Applications Symposium, 1998, 6 pages.
D. Durha,; "The COPS (Common Open Policy Service) Protocol", Network Working Group, Jan. 2000; 38 pages.
L. Simcox, "Autonomic features of the IBM Virtualization Engine"; IBM, http://www-128.ibm.com/developerworks/library-combined/. backup/ac-vc/, Sep. 14, 2004; 10 pages.
Wilfred Jamison et al.; Architecting on demand solutions, part 6: Optimize your on demand applications and resources using IBM WebSphere Extended Deployment 5.1, by Wilfred Jamison and Ann Black-Ziegelbein and published at http://www6.software.ibm.com/ software/developer/library/i-odoebp6, or through wsadmin scripts; Feb. 22, 2005; 14 pages.
A. Andrieux et al.: Web Services Agreement Specification (WS-Agreemens)by the Grid Resource Allocation Agreement Protocol WG, in http://forge.gridforum.org/docman2/ViewCategory. php?group_id=71&category_id=659, Grid Resource Allocation Agreement Protocol (GRAAP) WG, Aug. 23, 2004; pp. 1-3B.

* cited by examiner

*Primary Examiner* — Edward Zee
(74) *Attorney, Agent, or Firm* — Tutunjian & Bitetto, P.C.; Louis J. Percello, Esq.

(57) ABSTRACT

A system and method for disseminating policies to multiple policy-based components includes a policy producer which generates a group of policies to be enforced. A policy disseminator classifies each policy with a type, and for each policy type, the policy disseminator identifies policy-based components that handle a corresponding policy type. The policy disseminator sends specific policy types from the group of policies to each policy-based component that can handle that specific policy type.

19 Claims, 26 Drawing Sheets

AUTOMATED DISSEMINATION OF ENTERPRISE POLICY FOR RUNTIME CUSTOMIZATION OF RESOURCE ARBITRATION

RELATED APPLICATION INFORMATION

This application is a Continuation application of U.S. patent application Ser. No. 11/170,697 filed Jun. 29, 2005 now abandoned, incorporated herein by reference in its entirety.

BACKGROUND

1. Technical Field

The present invention relates generally to methods and systems for automating the dissemination of enterprise policies to all policy-based components in an enterprise management infrastructure, derivation of component specific policies from global policies, and customization of resource arbitration among computing services based in objectives defined by the enterprise policies.

2. Description of the Related Art

An enterprise computing infrastructure, like that of a service-provider business, provides multiple computing services. These services are implemented by one or more service components, and the service components are managed by one or more information technology (IT) management components based on specific policies. For example, a service may be composed of multiple components running in a three-tier environment, i.e., web serving, application logic execution, and database access. The IT management components for managing these tiers may include workload management in an application server and database, resource allocation and provisioning for these tiers, etc. These IT management components, referred to herein as policy-based components, use multiple types of policies, including configuration rules, procedural (action) rules, and service level objectives.

A configuration rule defines the values of specific service parameters. Procedural rules define the procedure that the service should execute in response to specific events or situations. A service level objective refers to the quality of the provided service, and comprises a service level goal, a (time) qualifying condition, and expressions for one or more business value models (e.g., importance, penalty, reward, and utility) for meeting these service level objectives.

FIG. 1 shows a prior art system which includes manually setting of policies to multiple policy-based components that manage the same set of services or service components. More specifically, in an overall system with multiple policy-based components 4 (e.g., 4a-4c), a set of services 9, running on top of a set of enterprise resources 10, are managed by these policy-based components 4. The policies to be used by these policy-based components 11 (e.g., 11a-11c) are manually set by one or more administrators 12, using graphical user interfaces (GUIs) 16 (e.g., consoles) or administration script 14.

The administrators 12 learn and interpret the enterprise business goals, and manually define component policies. For example, as described in the web article "Autonomic features of the IBM Virtualization Engine", by Lori Simcox, published at the IBM website for the IBM Enterprise Workload Manager, the deployment of specific policy is done through the EWLM Control Center web-based console or through a Java-based programmatic interface. Similarly, for the IBM WebSphere Extended Deployment, the specification of service policy is done through the administrative console, as described in web article "Architecting on demand solutions, part 6: Optimize your on demand applications and resources using IBM WebSphere Extended Deployment 5.1, by Wilfred Jamison and Ann Black-Ziegelbein and published at the IBM website, or through wsadmin scripts.

In Internet RFC archives, RFC 2748 specifies Common Open Policy Service Protocol in a policy management framework, where the Policy Enforcement Point (PEP) clients receive policy information from a Policy Decision Point (PDP) server in the same administrative domain. A PEP "sends requests, updates, and deletes to the remote PDP and the PDP returns decisions back to the PEP". The server maintains the state of prior communication, and based on the identity of PEP, sends appropriate responses.

There are many different languages for specifying policies. Web Services Agreement (WS-Agreement) specification, being defined in Global Grid Forum, published in "Web Services Agreement Specification (WS-Agreement)" by the Grid Resource Allocation Agreement Prototcol WG uses four tuples in describing service level objective policies, as part of guarantee term definition.

Referring to FIG. 2, four components of a WS-Agreement policy are illustrated. The Scope component 301 of a policy defines service elements for which service level objectives are defined. The Qualifying Condition component 304 defines external conditions, such as time of the day, which must be met for a service level objective policy to be enforced. The Service Level Objective component 302 defines a condition expressing a service level to be enforced. Typically, this is expressed as a target associated with a Key Performance Indicator or KPI. Finally, the Business Value component, 303, defines value assertions by service clients or providers in meeting a service level objective. There are many business value models in defining value assertions. For example, priority can be used to prioritize one objective over other objectives. Under resource constraints, resources are allocated to meet objectives in terms of priority order. For a higher priority objective, once the KPI threshold is met, further improvement in service level is not required, and remaining resources should be allocated to meet the next set of objectives in terms of priority order.

Business value can also be expressed by both clients and providers in terms of a penalty function, where penalty (or reward) is expressed as a function of deviation from the KPI threshold. Yet, in another model, Business Value can be expressed as a preference of different service states in quantitative terms.

During runtime, multiple management components may interact with one another according to the policies governing their interactions. FIG. 3 illustrates a typical prior-art scenario for resource orchestration in an enterprise computing scenario, similar to the one presented in U.S. Patent Application 20030149685, "Method and System for Managing Resources in a Data Center". More specifically, in a system with multiple objective-based components 204 that manage a set of services 202 based on a set of specific objectives, on top of a set of enterprise resources 205, the resource arbitration among objective managers is performed by a resource arbiter 200. An arbiter's decision results in a provisioning plan 206, which is executed by a Resource Provisioner 207, by applying the related provisioning operations 208 on the related resources 205.

Administrators setup the specific objective policy for each of the objective managers and define the fixed service priorities, 213, based on which the arbiter makes the resource arbitration decisions. In the process of the arbitration decisions, the arbiter receives objective status information 209 from the objective manager and uses this information, along with the service priority 213 as input for its optimization method 211.

This approach is not appropriate when the business values of enterprise objectives depend on service performance parameters, such as a penalty value that depends on the amount of transactions that do exhibit a response time larger than the objective cannot be expressed by a fixed, predefined number. In contrast, this type of business value must be specified as a function that is evaluated at runtime based on the observed or predicted service Key Performance Indicators (KPIs).

Other proposals, including the "Utility Functions in Autonomic Systems", by W. Walsh, G. Tesauro, J. Kephart, R. Das, published in International Conference on Autonomic Computing, 2004, assume that the business-value model is encapsulated in the objective manager, which can provide on request the value associated with service levels achieved on a given resource allocation. This approach limits the ability of the enterprise to evolve its business model independently of the implementation of the objective managers in its IT infrastructure. For instance, in order to change the business value model from a priority-based service to a penalty-based service, the objective manager components handling only the priority model have to be extended with functionality for computing the penalty expression based on the appropriate service parameters.

In prior-art proposals, the arbitration method is designed to use fixed business value models, e.g., a fixed set of business value components, like importance, or penalty and reward. However, objectives originating from different sources and destined to different services can have different business value model components, e.g., some have only importance, while others have both importance and penalty. Depending on the mix of services subject to arbitration at a given moment in time, enterprise service objectives can indicate what type of business models to be used in arbitration, possibly indicating that more than one type to be used. For example, for one group of resources, the decision is based on the importance model, while for other group of resources, the decision is based on penalty and reward. As a consequence, the optimization method used by the arbiter changes along with the type of business value models.

With the prior art, the orchestration decisions are always based only on that particular set of business value models that are known to be defined for all service objectives at any time, such as importance. This approach prevents the enterprise from always applying the orchestration objectives that best fit its business model. For example, at times when the actual common business value model includes both importance and penalty versus only penalty, the enterprise objective is to minimize penalty, yet ensure that the higher importance objectives are given priority. In this case, a decision that ignores importance and minimizes penalty overall, might affect higher importance objectives to the benefit of lower importance objectives with lower penalty.

Prior-art proposals, including "FARA—A Framework for Adaptive Resource Allocation in Complex Real-Time Systems", by D. Rosu, K. Schwan, S. Yalamanchili, published in the IEEE Real-Time and Embedded Technology And Applications Symposium", 1998, have considered the runtime customization of the arbitration method based on the type of violated service objectives, but it uses a fixed value model.

SUMMARY

A system and method for disseminating policies to multiple policy-based components includes a policy producer which generates a group of policies to be enforced. A policy disseminator classifies each policy with a type, and for each policy type, the policy disseminator identifies policy-based components that handle a corresponding policy type. The policy disseminator sends specific policy types from the group of policies to each policy-based component that can handle that specific policy type.

A system and method for resource arbitration in an information technology environment among a group of objective-manager components each managing a set of service objectives includes a resource-arbiter component which performs arbitration by using a procedure for optimization across values of individual service objectives managed by all components in a group. A value of each individual objective is determined based upon one or more models and defined in a system-level service objective policy as a function of service Key Performance Indicators (KPI). An optimization method is selected based on the value models defined for the service objectives considered for arbitration, according to system-level objectives.

A method for disseminating policies to multiple policy-based components includes generating a group of policies to be enforced and disseminating the policies. Each policy is classified with a type, and for each policy type, a policy disseminator identifies policy-based components that handle a corresponding policy type. The policy disseminator sends specific policy types from the group of policies to each policy-based component that can handle that specific policy type.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
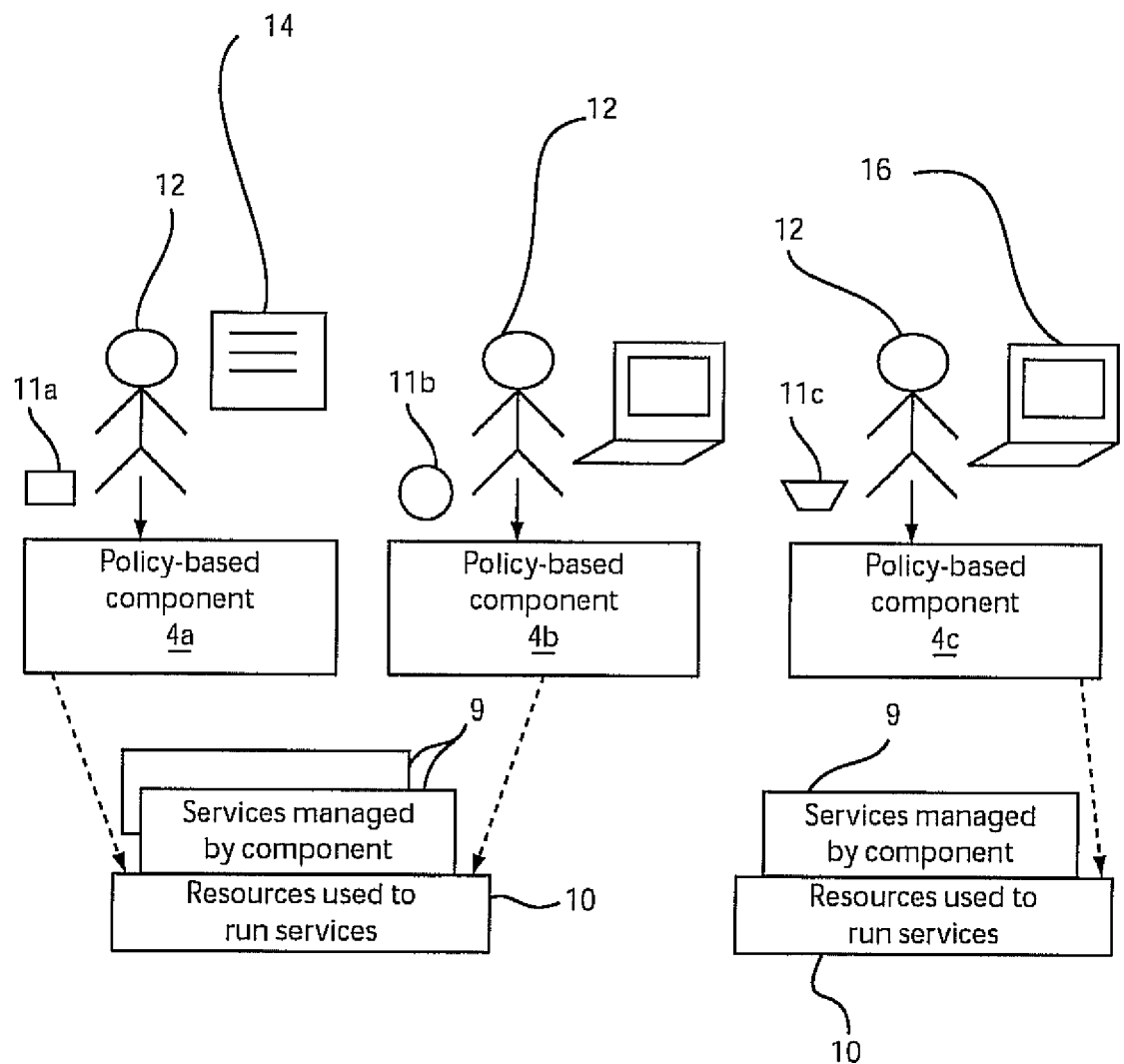
FIG. 1 is a block diagram of an architecture of a system with policy-based components and per-component manual policy specification in accordance with the prior art.

The present invention is related to the use of enterprise business objectives in driving the activity of the various policy-based components in the enterprise information technology (IT) infrastructure. The policies used by policy-based components are derived from the business goals of the enterprise. For example, for an Application Service Provider (ASP) business, the Service Level Agreements (SLAs) that the enterprise has established with its customers specifies access control to various services by customers as well as performance and resiliency requirements. These SLA terms, in turn determine the configuration of security policies to be enforced by a Lightweight Directory Access Protocol (LDAP) server, the configuration parameters for the cluster of WebSphere Application Servers, and the service objectives for the workload manager, the resiliency manager, and the resource arbiter.

One characteristic of a service-provider and other similar businesses is that the set of enterprise business goals evolves in time with respect to the actual objectives and with respect to the models employed to define the value of enterprise business goals. Therefore, for the effective management of the overall business, the business value models employed by enterprise business goals should be accurately reflected in the per-component policies and procedures. This is most stringent for the resource arbiter, which allocates the enterprise IT resources among the IT components such that the overall business value of their service objectives is maximized.

The process of managing the enterprise services based on enterprise business goals comprises three elements. First is the dissemination of enterprise business goals to system components by creation and deployment of component-specific policies derived from the enterprise business goals. Second is the component-level service management such that, for the available resource allocation, the business value of the specific service objectives is maximized. Finally, is the reallocation of resources among components such to maximize the enterprise business value. The present invention is related to these elements, namely, the creation and deployment of component-specific policies and the reallocation of resources among objective-based components.

Aspects of the present invention include methods and systems for automated dissemination of enterprise business goals to policy-based IT components in an enterprise infrastructure. The automated dissemination is performed by an IT management component, called a policy disseminator, for ease of reference, and involves a plurality of steps. A first step may include the analysis of enterprise business goals to identify their types. The second step may include mapping of enterprise business goals to one or more policy-based components based on goal types and component roles. Policy types and component roles can be defined at runtime.

The third step of the automated dissemination may include interpreting the enterprise goals and translating them to items of component-specific policy. A later step may include the creation and deployment of component-specific policy based on information extracted from one or more enterprise business goals and on component-specific information, such as deployment details. The translation and deployment steps can be performed by a component-specific module. The protocol used for the interaction between the policy disseminator and this component-specific module depends on a type of policies that is transferred.

Another aspect of the present invention includes methods and systems for resource orchestration based on the business value of system-level service objectives. The present invention includes resource orchestration which can handle service objectives with one or more business value models and can select at runtime the business value models and the method to use for optimization of resource allocation according to the current set of enterprise business goals and system-level objectives.

An optimization method comprises a set of functions for aggregation of individual objective values into method-specific aggregation value types, and functions for comparison of two method-specific aggregation values. The aggregation model is preferably hierarchical. At the lowest level, an aggregation function uses the objective business values computed based on service key performance indicators (KPIs), or, directly, service KPIs. At higher-levels, aggregation functions use values produced by lower-level aggregation functions. Aggregation hierarchy can correspond to the IT management hierarchy, with multiple levels of objective managers and resource arbiters.

The service KPIs used in the computation of service objective business values are based on the input provided by objective-manager components. The role of an objective manager is to manage the service such that it complies with the set of specific service objectives it manages. These specific service objectives are derived from the system-level service objective policy. The derivation can be performed by resource-arbiter components associated with the objective manager. The system-level service objectives used in the derivation can be disseminated to the objective managers by resource arbiter components.

The optimization procedure can be performed by the collaboration of distributed components of the resource arbiter. Distributed components can be associated with the objective managers and can perform aggregation functions at the level of corresponding managers. The aggregate values are forwarded to other components of the arbiter that perform aggregations and comparisons at higher levels.

The present invention addresses multiple enterprise business needs. First, the automated dissemination of policies helps reduce the enterprise costs with system management, and ensures the correctness and timeliness of the transformation of enterprise-level policies to component-level policies. Second, the runtime selection of the optimization method helps ensure that resource orchestration reflects the evolution of the enterprise business models and the system-level objectives immediately and with minimal, if any, costs. The corroboration of automated dissemination and resource arbitration enables a consistent, correct and timely application of the system-level service objective at all levels of the enterprise IT infrastructure.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
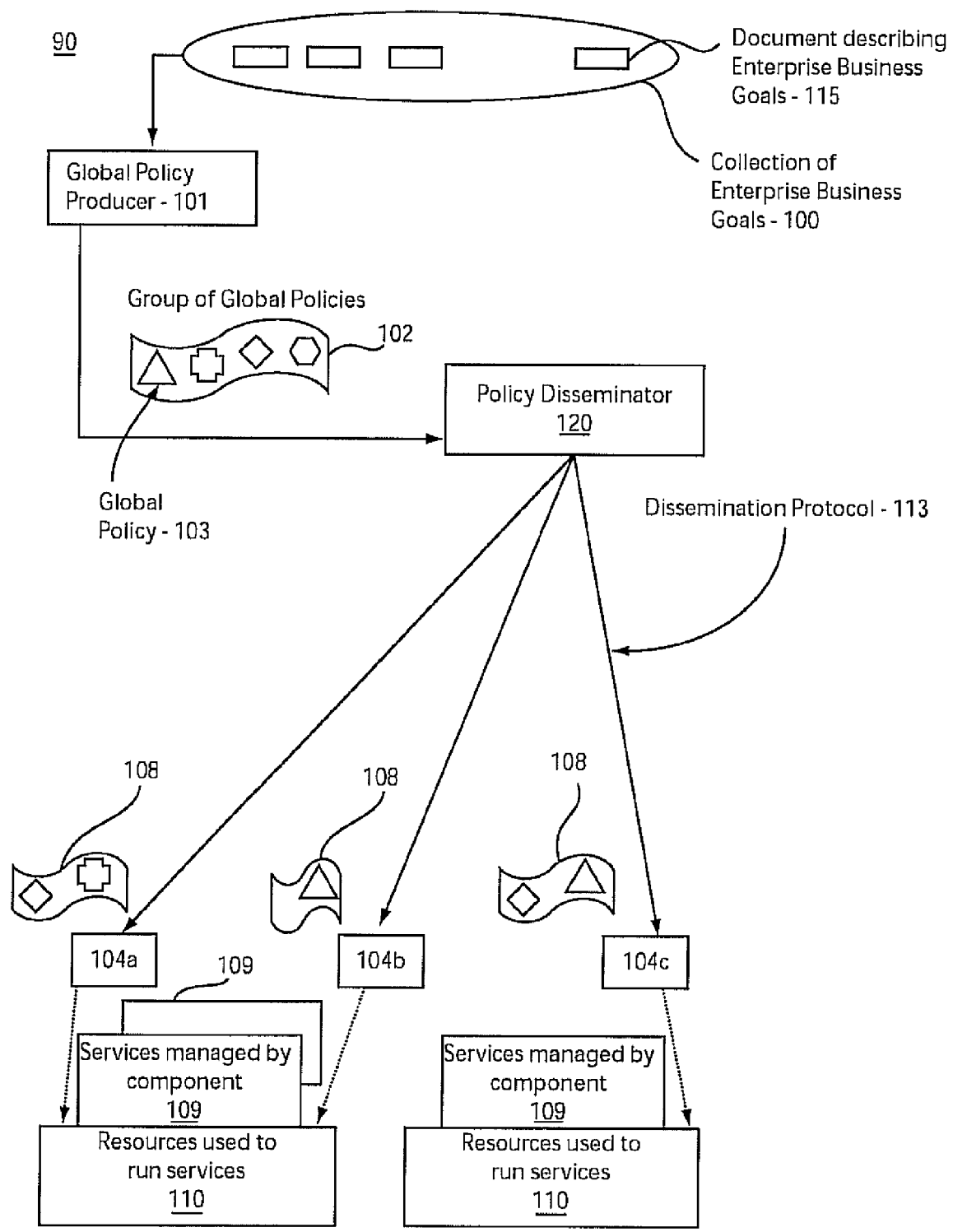
FIG. 4 is a block/flow diagram showing architecture for automated policy dissemination to policy-based components in accordance with an illustrative embodiment.

Referring now to the drawings in which like numerals represent the same or similar elements and initially to FIG. 4, an illustrative architecture for an automated dissemination of global policy is shown in accordance with one embodiment. An enterprise system architecture 90 includes multiple groups of resources 110, used in providing multiple IT services 109. The architecture 90 comprises multiple policy-based components 104, each providing or managing one or more services 109. The policy-based components 104 (e.g., 104a-104c), are driven based on component-specific policy 111 (e.g., 111a-111c), (see also 11 in FIG. 1).

A global policy producer 101 creates global policies 102, from which the policies used by policy-based components 104 (e.g., 104a-104c) are derived. The global policy producer 101 forwards the global policies 102 to the policy disseminator 120, which automatically disseminates the policies to policy-based components 104a-104c. In this process, the policy disseminator 120 filters global policies for each policy-based component 104a-104c producing filtered global policies 108. The filtered global policy 108 is forwarded to policy-based components 104a-104c using a specific dissemination protocol 113. Each component 104a-104c may receive a different set of policies as filtered by disseminator 120.

The global policy producer creates global policies 102 based on the collection of enterprise business goals 100. This collection comprises a set of enterprise-specific documents 112 such as Service Level Agreements (SLA) with the enterprise customers, enterprise-level rules for running the IT infrastructure, and other types. The enterprise business goals 100 are interpreted by the global policy producer 101, which uses the resulting information to create groups of global policy 102 represented as global policy documents. The global policy producer 101 can be human assisted by appropriate computing tools.

In an alternative embodiment, global policy producer 101 can be a fully automated component, whose input is a collection of enterprise-specific documents 112 in electronic format, and whose output is a group of global policies 102. The grouping of the global policies produced by the global policy producer 101 may be based on multiple criteria. For example, a policy group 102 can include all policies derived from given enterprise-specific documents 112. This can result in policies related to multiple services to be included in the same group.

In an alternative embodiment, a group of global policies can include all of the policies related to a customer, or all the policies related to a customer service or group of services.

A policy disseminator 120 receives the global policy documents and related processing commands (102) through one of its service interfaces. The policy disseminator 120 handles commands for dissemination of content of a policy group and commands for dissemination of discard notifications of a policy group. In an alternative embodiment, the policy disseminator 120 can handle commands for updates of policy-group content. The update command can be implemented as a sequence of two commands, a dissemination of discard notification followed by a dissemination of content.

Figure 5:
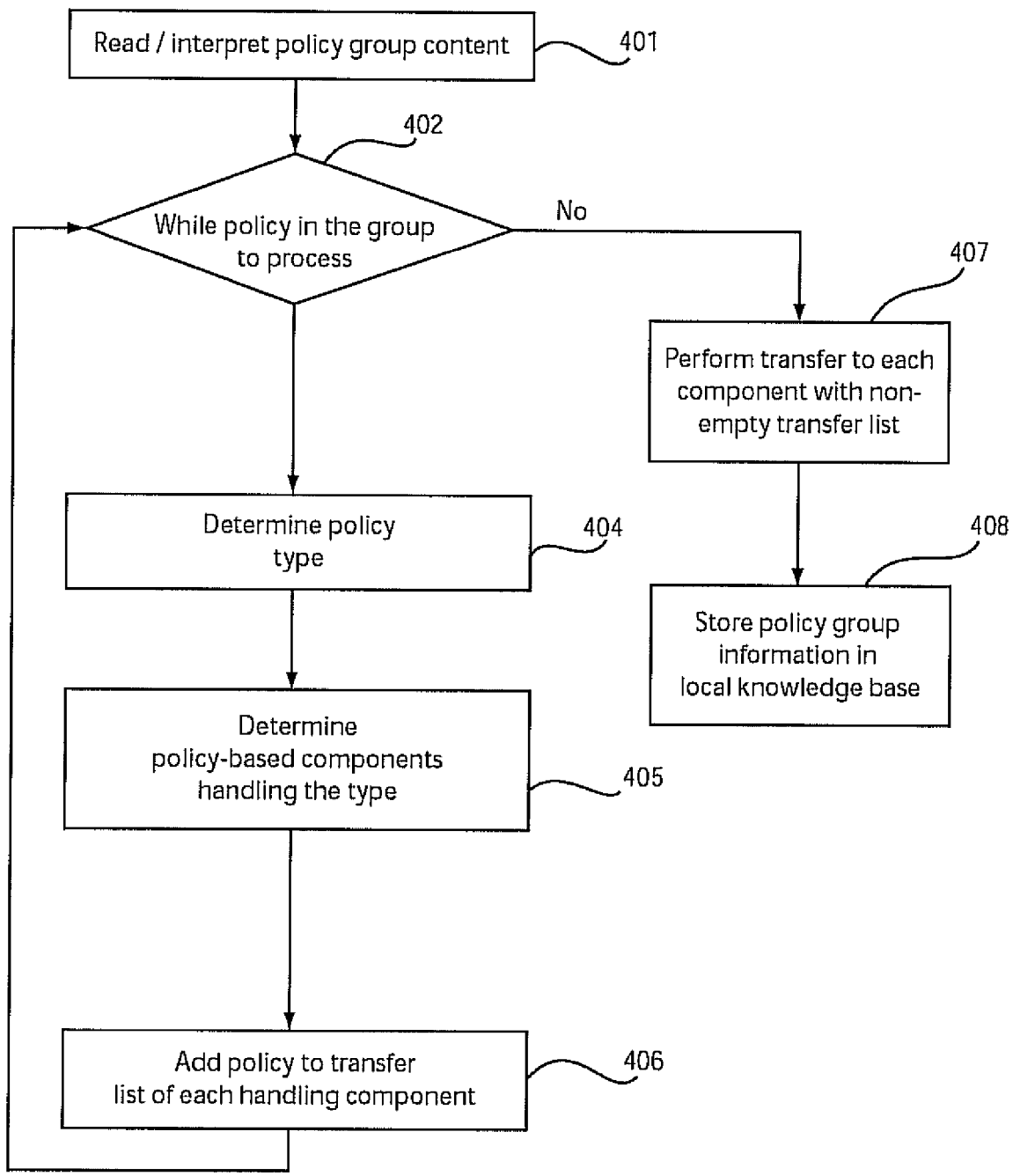
FIG. 5 is a block/flow diagram of a procedure for handling a command for dissemination of content of a policy group performed by a policy disseminator in accordance with an illustrative embodiment.

Referring to FIG. 5 with continued reference to FIG. 4, a flow diagram showing an illustrative embodiment for a policy disseminator's handling of a command for dissemination of content of a policy group is shown. Upon receiving a command, the policy disseminator reads and interprets the new content to identify the policies 103 in the policy group 102. For each policy in the group, in block 402, the policy disseminator 120 determines the policy type, in block 404, based on the content of the global policy 103. In block 405, the disseminator 120 determines the policy-based components that handle the identified policy type. For each identified policy-based components, in block 406, the disseminator 120 adds the policy reference to the transfer list of the component.

After all policies in the group are handled, the policy-disseminator executes block 407 which initiates the transfer of the policies just collected in the transfer lists of each policy-based component. In block 408, the policy disseminator 120 records in a local knowledge base, the policy group details and the list of policy-based components that were forwarded to one or more policies in the group. The policy disseminator 120 may manage the transfer lists of policy-based components as follows: before processing block 402, the disseminator 120 creates an empty transfer list for each of the components. In block 407, the disseminator adds the current transfer list of a component, if not empty, to the pending transfer queue of the component, from which the list will be extracted and transferred to the component through a specific dissemination protocol 113.

Figure 6:
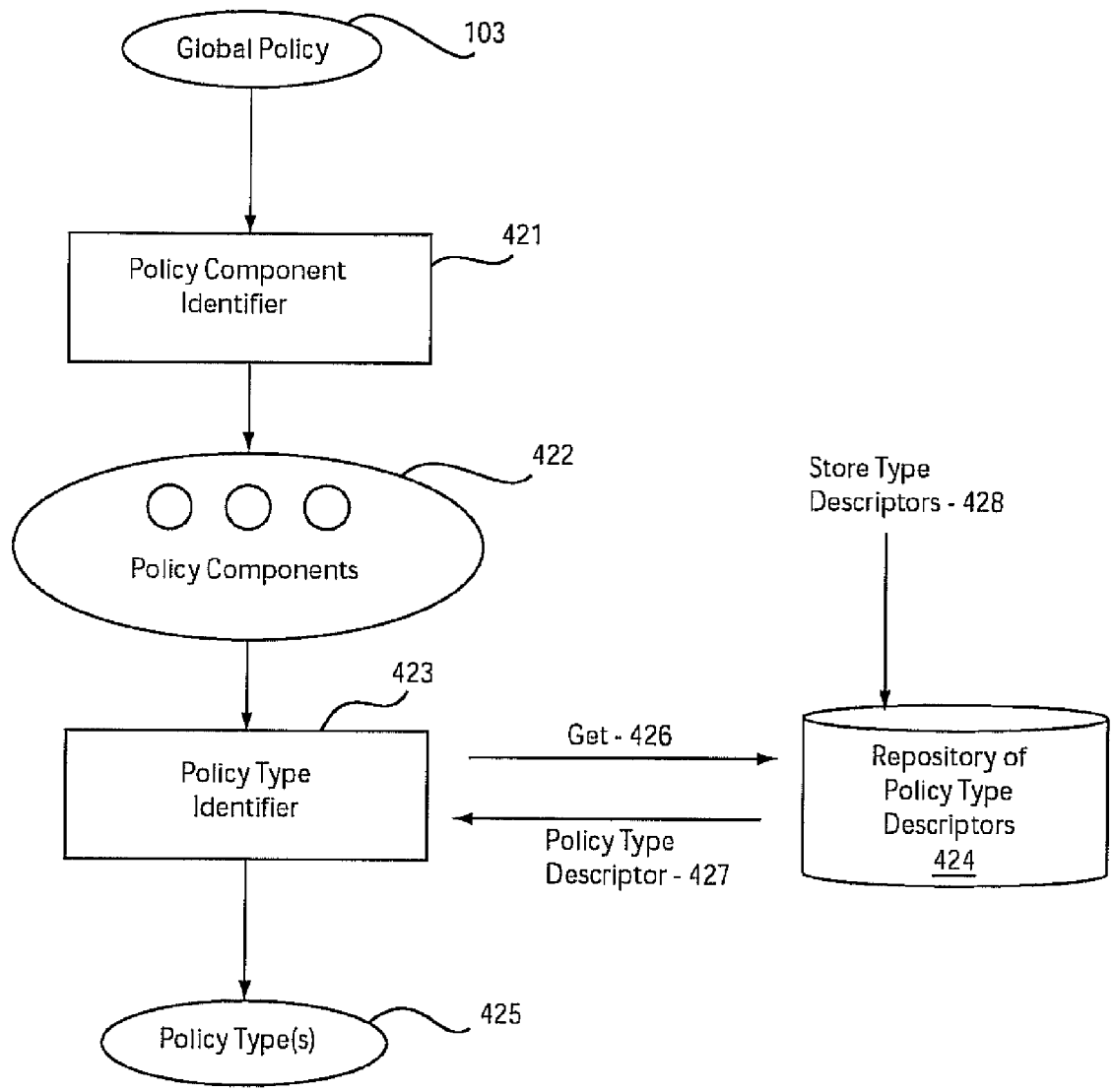
FIG. 6 is a block/flow diagram showing architecture for determining a policy type in accordance with an illustrative embodiment.

In block 404, the policy type is determined as illustrated in greater detail in FIG. 6. Referring to FIG. 6, the policy disseminator 120 includes two component modules, a policy-component identifier 421 and a policy-type identifier 423. The policy-component identifier 421 takes as input a global policy 103, and produces a list of policy components 422 of this policy. Further, the list of policy components 422 is input to the policy-type identifier 423, which produces one or more policy types, 425 that correspond to a particular policy content. This is accomplished by using a repository of policy type descriptors 424. Namely, the policy-type identifier uses 'get' commands 426 to retrieve policy type descriptors 427 from the queries the repository 424. Further, the policy-type identifier checks how the policy components 422 match retrieved policy type descriptors 427, and output those policy types for which a match is determined.

The type of policy components in the list 422 produced by the policy-component identifier 421 depends on a policy specification format. In an example embodiment, the policy specification format is similar to a WS-Agreement specification, as described with reference to FIG. 2.

Figure 2:
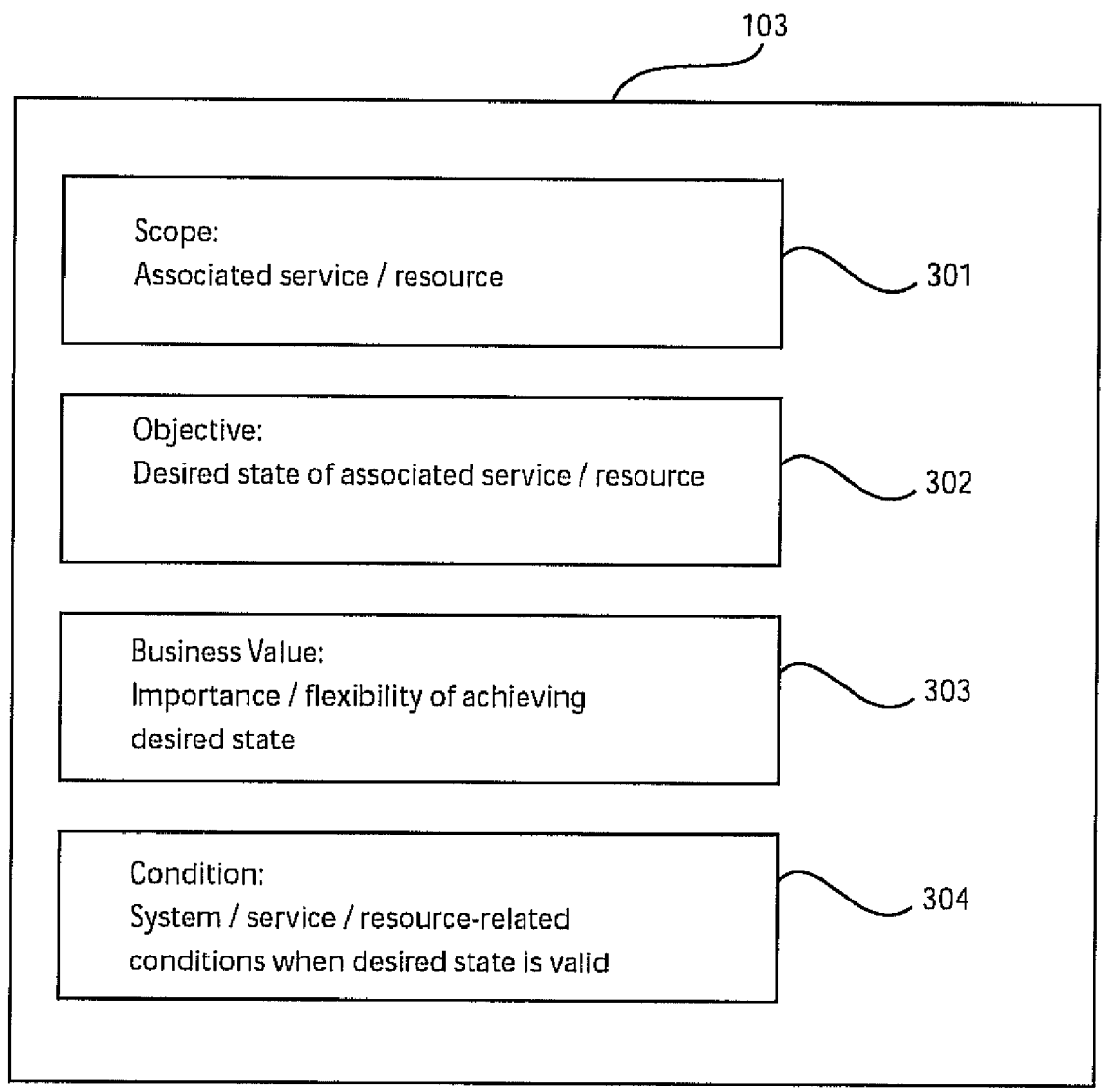
FIG. 2 is a diagram showing typical global policy content.
Figure 3:
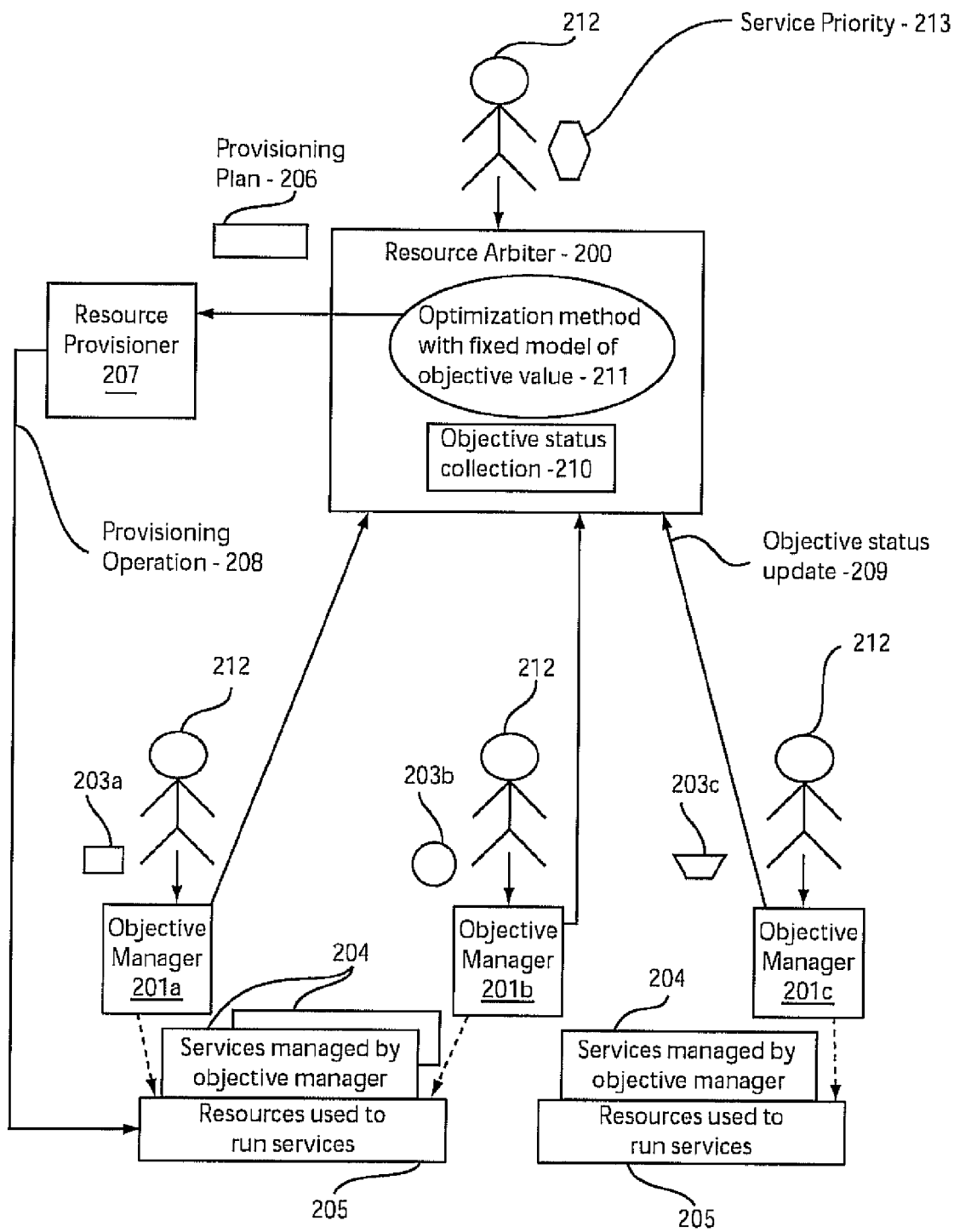
FIG. 3 is a block diagram of a system architecture with resource provisioner with a fixed model for objective business values in accordance with the prior art.

Referring to FIG. 2, the global policy comprises four components: a scope component, 301, which describes the enterprise service or resources that the policy refers to; an objective component, 302, which describes the desired state of the services and resources in the policy scope, 301; a business value component, 303, which describes the importance of achieving the desired state and possibly, the flexibility of performing at other states; a condition component, 304, which describes the conditions related to the system, service and resources in which the desired state and importance information are valid. In alternative embodiment, the condition component is optional.

Referring again to FIG. 6, the type of components in the list produced by the policy-component identifier 421 may depend on the format of policy-type specification used by the global policy disseminator 120. For example, in one embodiment, the policy type is determined based on the content of the policy scope 301 and of the policy objective 302, the list, 422, produced by the policy-component identifier 421 can only include descriptors for the policy scope and objective. In an alternative embodiment, the policy-component identifier 421 can produce descriptors for all of the policy components. The policy-type descriptor 427 may include a plurality of components.

Figure 7:
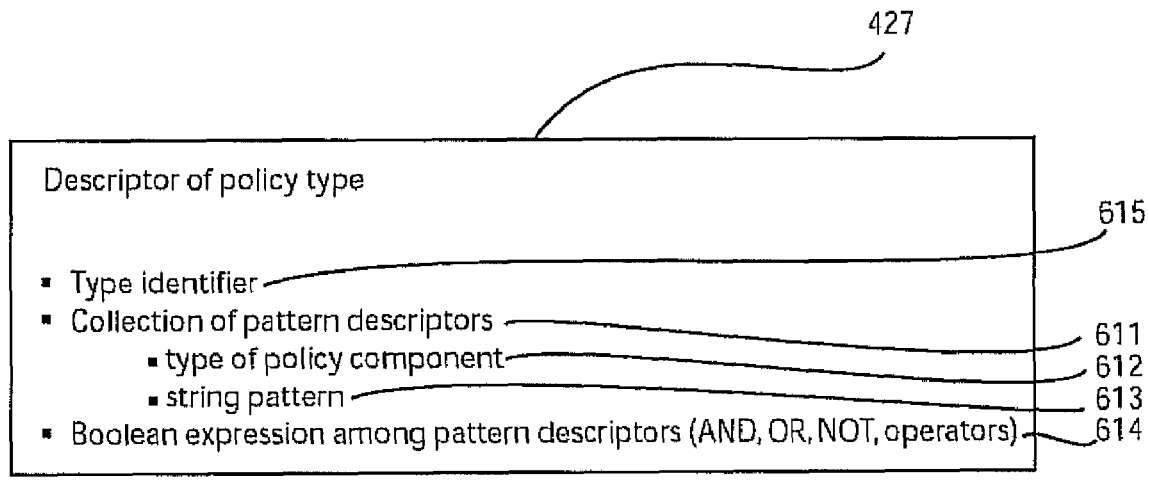
FIG. 7 is a diagram showing data structures maintained by a policy disseminator for a descriptor of policy type in accordance with an illustrative embodiment.

Referring to FIG. 7, an illustrative sample specification is shown including a type identifier 615, a collection of pattern descriptors 611, and a Boolean expression among the pattern descriptors 614. A pattern identifies a type of policy component 612, such as scope 301 and objective 302, and a string pattern 613 to be matched against the content of the policy component identified by the type 612. The Boolean expression 614 defines how the various patterns should be combined to assess that the policy is of the given type.

Referring again to FIG. 6, the policy-type descriptors 427 are stored in the repository 424 at runtime or offline. The store operation 42B can be performed as part of an automated process or as GUI input by a human operator.

Figure 8:
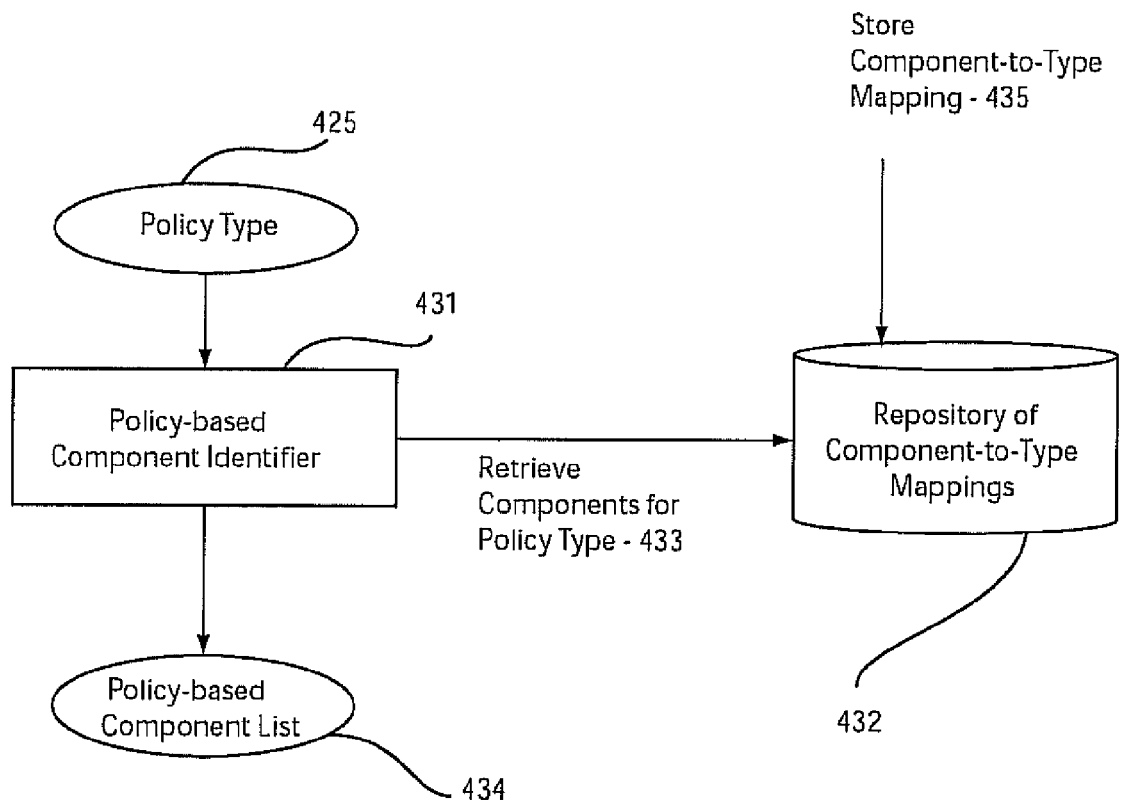
FIG. 8 is a block/flow diagram showing architecture for determining policy-based components handling a policy type based on component-to-type mappings in accordance with an illustrative embodiment.

In block 405 of FIG. 5, the step of determining the policy-based components handling of a policy type is illustrated in greater detail in FIG. 8. The global policy disseminator 120 (FIG. 4) includes a policy-based component identifier 431, which takes as input a policy type 425 and produces a list 434 of policy-based components that handle the particular policy type. This is achieved by using a repository 432 that identifies for each policy-based component, which policy types that component handles. The identifier 431 queries the repository 432 with requests 433 that identify a policy type and return a list of policy-based component identifiers. The mappings of policy-based components to handled policy types are stored in the repository 432 at runtime or offline. The store operation 435 can be performed as part of an automated process or as GUI input by a human operator.

Figure 9:
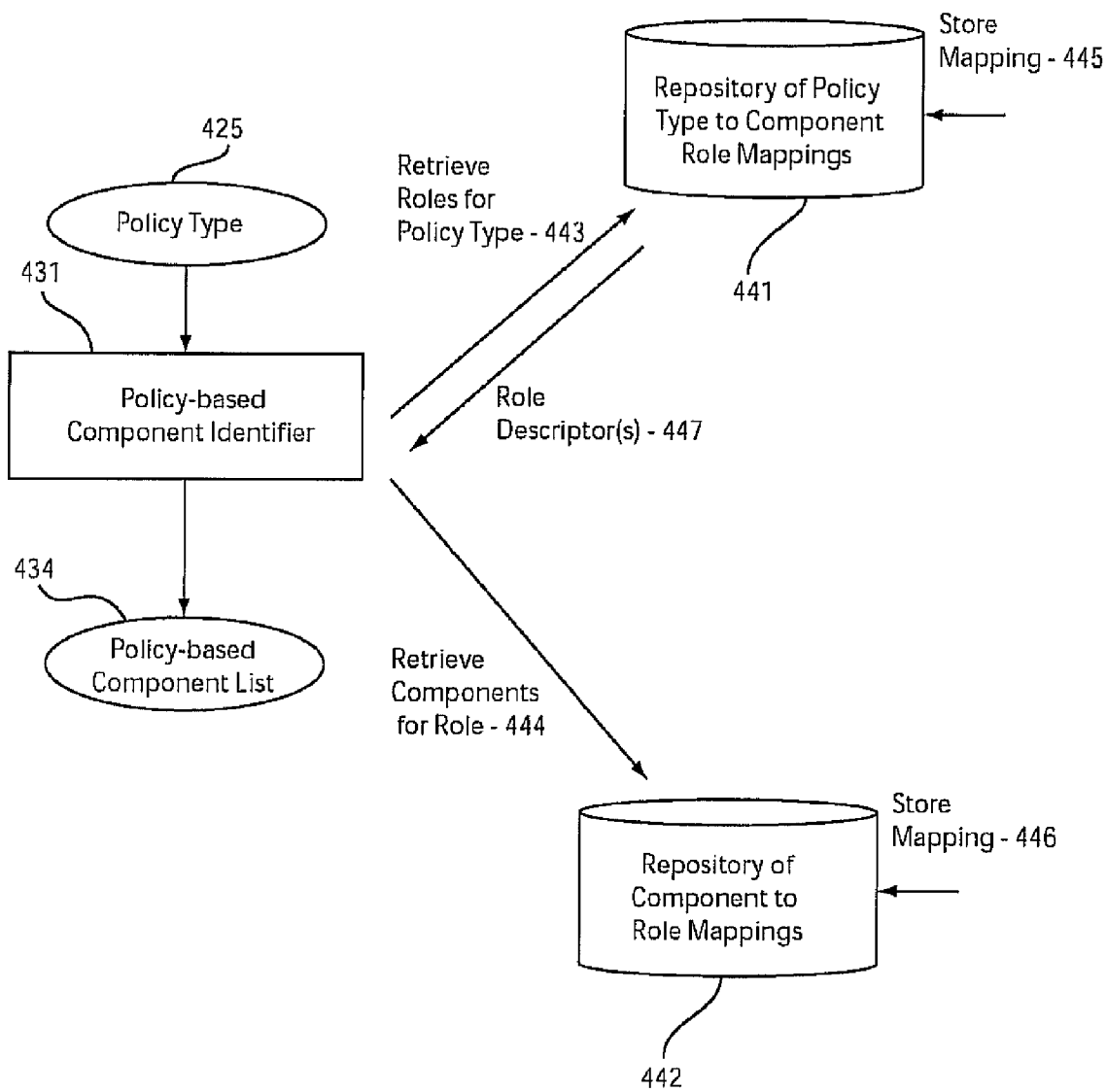
FIG. 9 is a block/flow diagram showing architecture for determining the policy-based components handling a policy type based on component roles in accordance with an illustrative embodiment.

An alternative embodiment of block 405 of FIG. 5 includes the step of determining the policy-based components handling a policy type and is illustrated in FIG. 9. In this embodiment, the identification of which components handle a particular type of policy is based on component roles. Namely, components are identified as performing one or more roles, and policy types are associated with one or more component roles. The policy-based component identifier 431 uses two repositories for performing its function. One repository 441 stores the mappings of policy type to component roles, and the other repository 442 stores the mappings of components to roles. Upon input of a policy type 425, the policy-based component identifier 431 issues a query 443 to the repository 441 to retrieve the component roles associated with the particular policy type 425. The response is one or more component role descriptors 447. For each of the returned role descriptors, the policy-based component identifier 431 issues a query 444 to the repository of component-to-role mappings 442 to retrieve the list of components performing the particular role. These components are added to the list of policy-based components 434 produced as output by the policy-based component identifier 434.

A component role descriptor 447 includes a role identifier. The mappings of policy types to component roles are stored in the repository 441 at runtime or offline. The store operation 445 can be performed as part of an automated process or as GUI input by a human operator. Similarly, the mappings of policy-based components to roles are stored in the repository 442 at runtime or offline. The store operation 446 can be performed as part of an automated process or as GUI input by a human operator.

Figure 10:
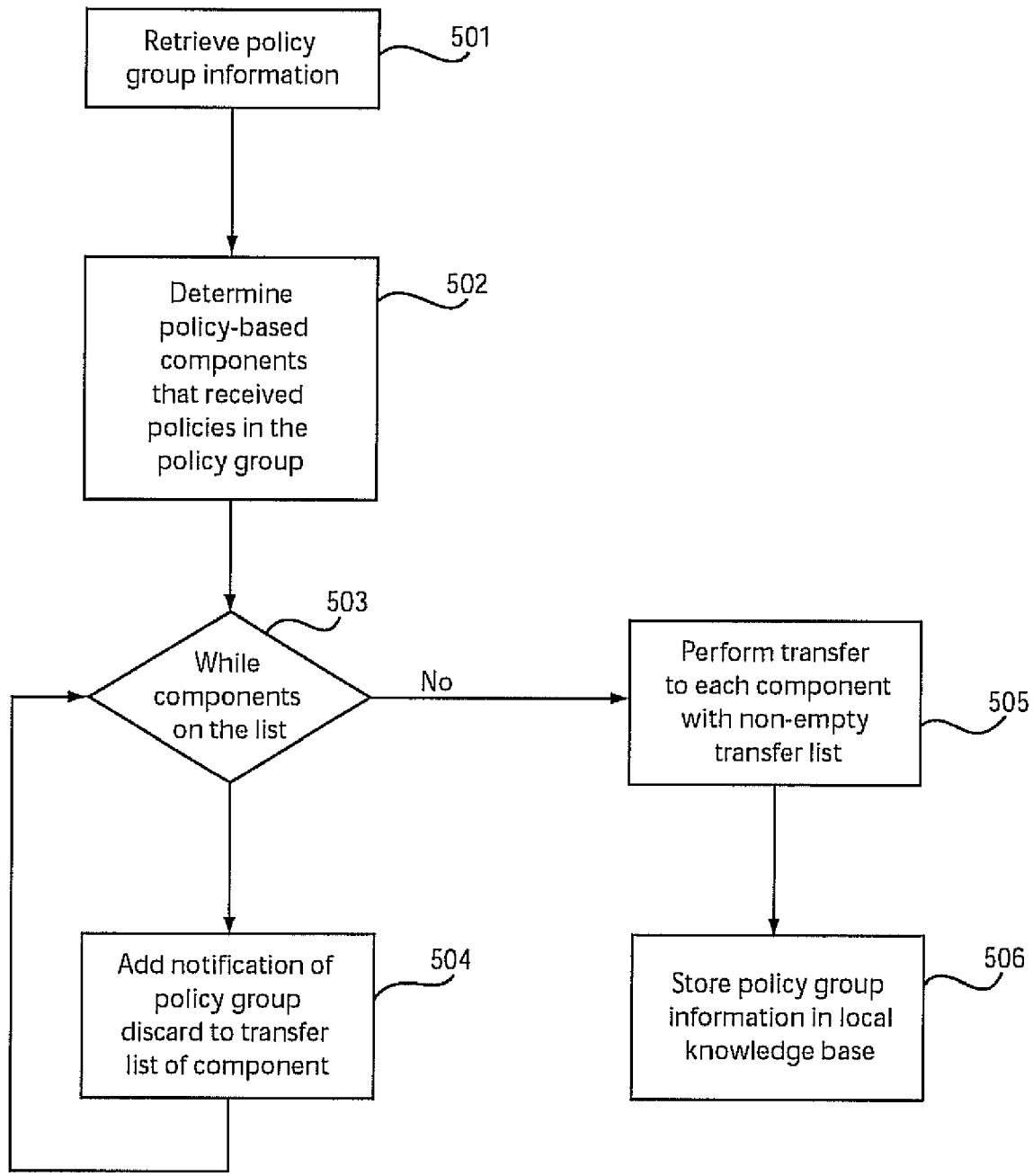
FIG. 10 is a block/flow diagram showing a procedure for handling a command for notification of discard of a policy group performed by a policy disseminator in accordance with an illustrative embodiment.

Referring to FIG. 10, a block/flow diagram of the policy disseminator's process for handling a command for dissemination of discard notification for a policy group 102 (FIG. 4) is illustratively shown. Upon receiving a command in block 501, the policy disseminator 120 (FIG. 4) processes the request to identify the policy group and retrieves related information from its local knowledge base. Further, in block 502, the policy disseminator identifies the policy-based components that were forwarded policies 103 (FIG. 4) from the policy group. In an iteration over all of these components, in block 503, the policy disseminator adds a discard notification to the transfer list of the component, in block 504. After all policies in the group are handled, the policy-disseminator executes block 505, initiating the transfer of the notification to each of the related components. In block 506, the policy disseminator records the discard of the policy group in its local knowledge base.

Figure 11:
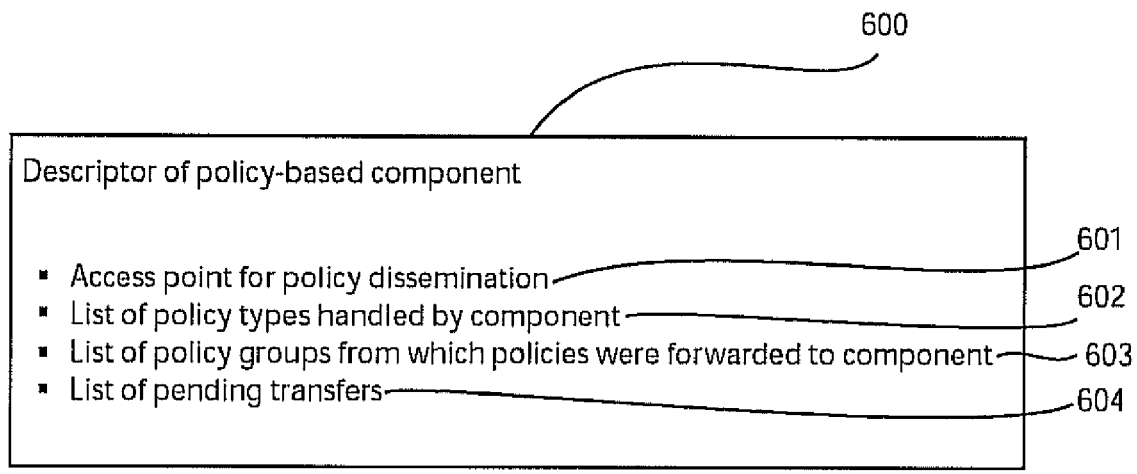
FIG. 11 is a diagram showing a data structure maintained by a policy disseminator for a descriptor of a policy-based component in accordance with an illustrative embodiment.

Referring to FIG. 11, the data structures maintained by the policy distributor to perform the filtering and dissemination of global policies may include a descriptor of a policy-based component and a descriptor of a policy type. The components of a descriptor of a policy-based component 600 are illustrated in FIG. 11, and include a descriptor of the component's access point 601 to be used for policy dissemination, a list 602 of the policy types handled by the component, a list 603 of the policy groups from which policies were forwarded to the component, and a list 604 of pending transfers.

Referring again to FIG. 4, the dissemination protocol 113 is selected based on the types of policy being forwarded. For example, the dissemination can be implemented by a simple invocation a specific web service of the policy-based component. In an alternative embodiment, the dissemination can be implemented as an agreement between the policy disseminator and the policy-based component. Also, in one embodiment, policies can be transferred in groups 108 that reflect the original global policy group content 102. In alternative embodiments, the policies can be transferred individually or in groups that are not related to the original global policy. The content actually transferred through the dissemination protocol can include additional information besides the actual policy content, such as details about the global policy document that originated the policy.

The policy content disseminated to policy-based components can be actually received by the component itself or by a component-specific policy adapter 107. The role of the adapter is to translate the global policy content into component-specific policy and to deploy this specific policy to the component.

Figure 12:
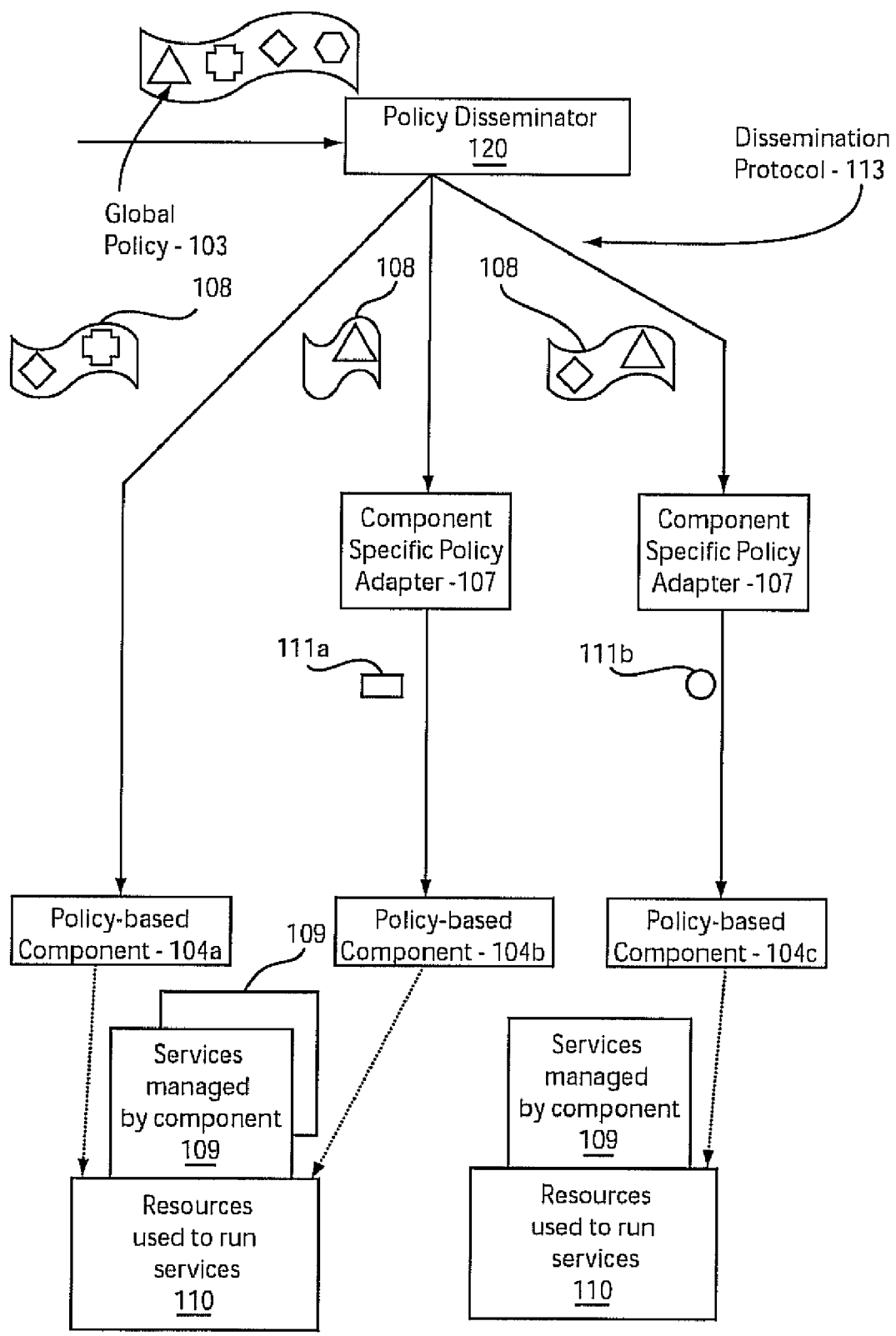
FIG. 12 is a block/flow diagram showing architecture for automated policy dissemination with policy-based components with policy transformation in accordance with an illustrative embodiment.
Figure 13:
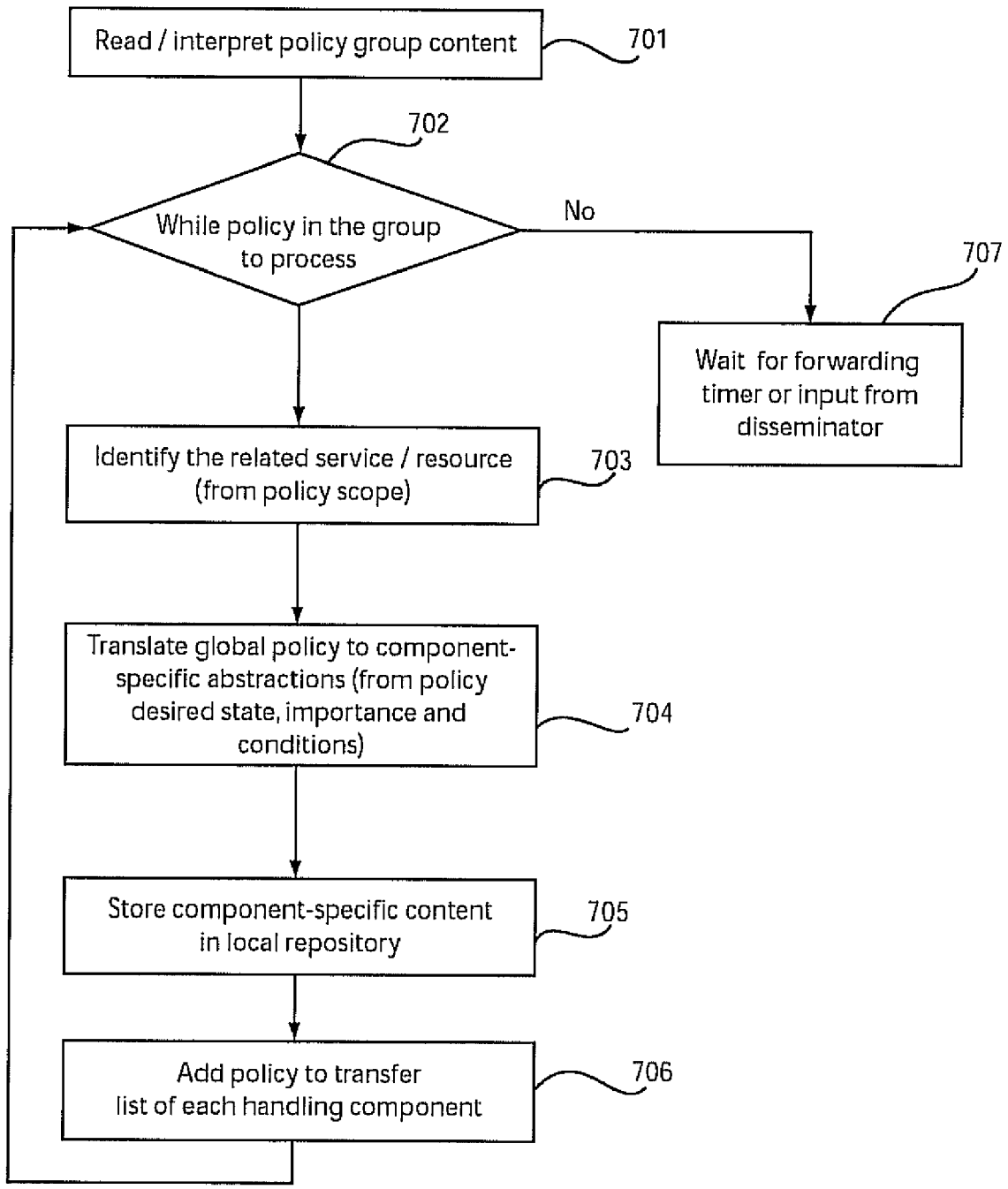
FIG. 13 is a block/flow diagram showing a procedure for handling the input of a newly disseminated policy group performed by a component-specific policy adapter in accordance with an illustrative embodiment.

Referring to FIGS. 12 and 13, a policy adapter's procedure for handling a newly disseminated policy group is illustratively shown. Upon receiving the disseminated content, a component-specific policy adapter(s) 107 reads and interprets the new content to identify the policies in block 701. For each policy, in block 702, the policy adapter 107 performs the following. In block 703, the adapter uses the policy scope component (e.g., 301 in FIG. 2) to identify the related service or resource that the component 104 (e.g., 104a-104c) manages. In block 704, the policy adapter 107 identifies the component-specific policy abstractions that derive from policy objective (e.g., 302 in FIG. 2), business value (e.g., 303 in FIG. 2), and condition (e.g., 304 in FIG. 2). In block 705, the component-specific information is stored in adapter's repository. In block 706, the adapter identifies the moment in time when it has to forward the newly extracted component-specific policy information to the component 104. The forwarding can be immediate or at some future time, depending on component capabilities to handle time conditions, on the policy condition or on other policy group piece of content. After all policies are processed, the policy adapter stops, waits for the forwarding timer to expire or waits for a new input from the policy disseminator 120.

Figure 14:
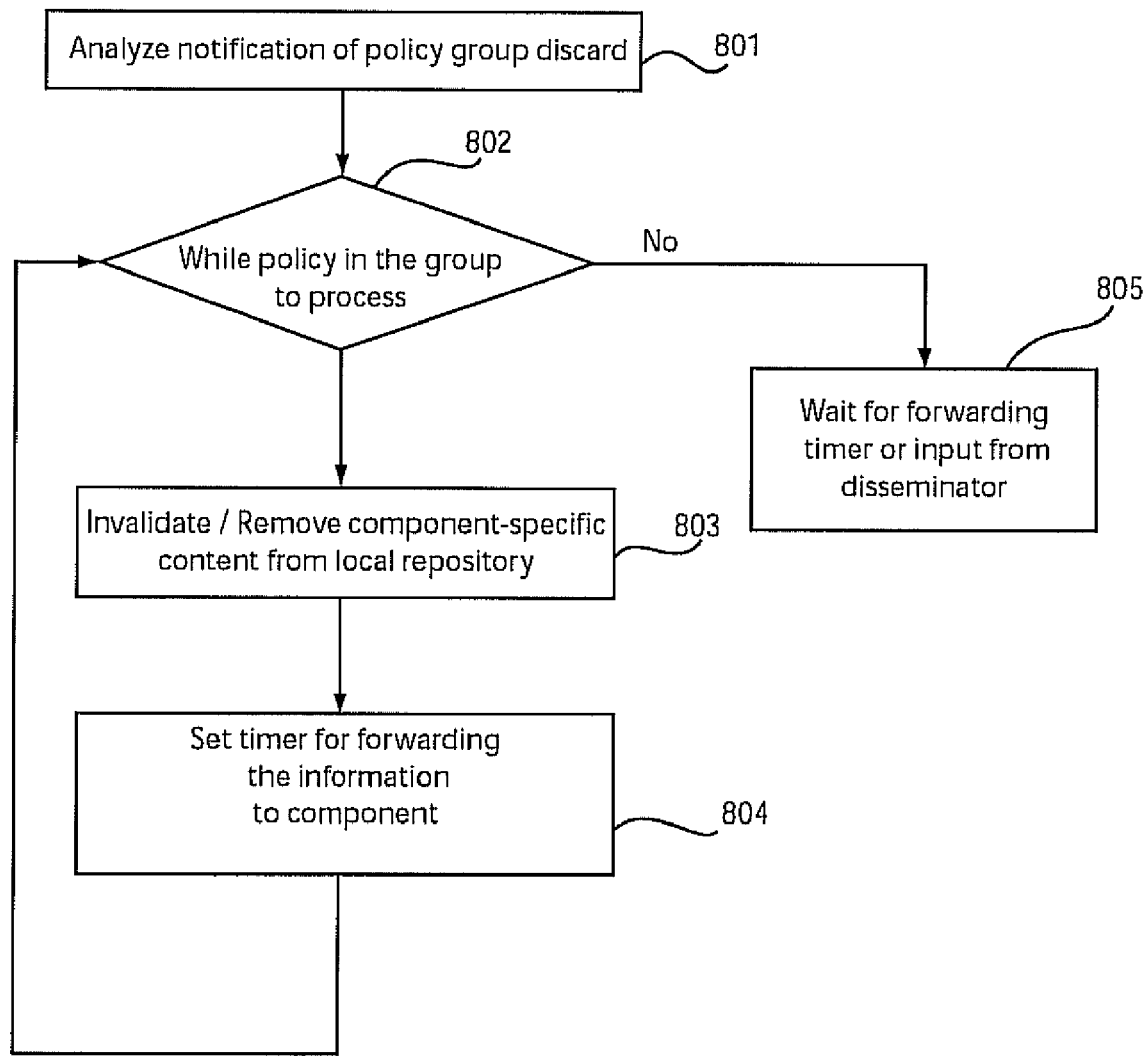
FIG. 14 is a block/flow diagram showing a procedure for handling a notification to discard a policy group performed by a component-specific policy adapter in accordance with an illustrative embodiment.

Referring to FIGS. 12 and 14, the policy adapter's procedure for handling a notification of policy-group discard is illustratively shown. Upon receiving the notification, in block 801, the policy adapter analyzes the notification and retrieves the information related to the policy group from its local repository. For all of the policies in the group, in block 802, the adapter in block 803 identifies and removes the related component-specific abstractions from the local repository. In block 804, the adapter determines the time when updates have to be forwarded to the component 104. The forwarding can be immediate or at some future time, depending on the component capabilities for handling time conditions, on whether the related component-specific policy is currently in use by the component, on the policy condition or other policy group piece of content. After all policies are processed, the policy adapter stops, waits for the forwarding timer to expire or waits for new input from the policy disseminator 120.

Figure 15:
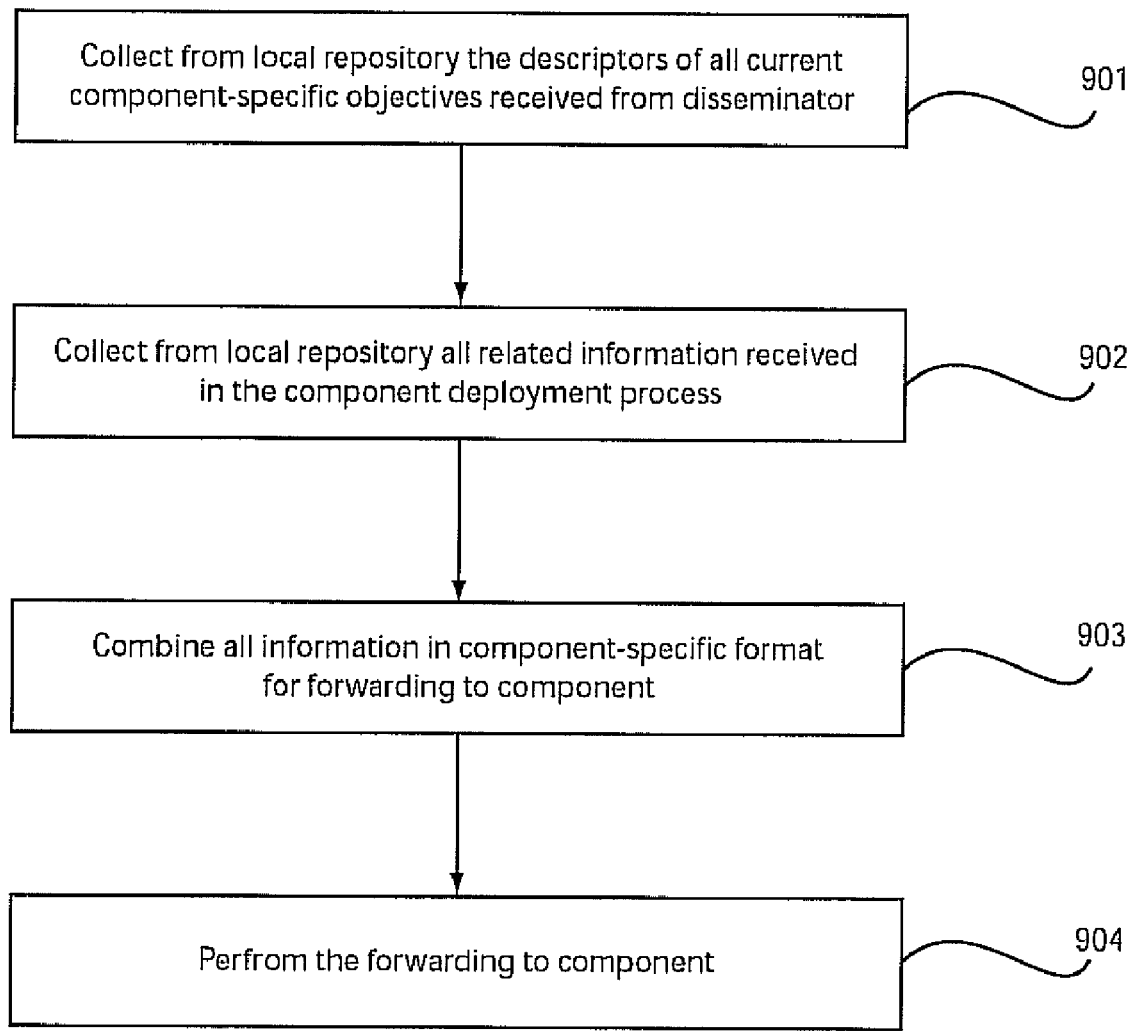
FIG. 15 is a block/flow diagram showing a procedure for forwarding current policy to policy-based components, performed by a component-specific policy adapter in accordance with an illustrative embodiment.

Referring to FIG. 15, the policy adapter's procedure for forwarding specific policy to the policy-based component is illustratively shown. This procedure is executed when timing conditions become valid or upon dissemination of new content or request, if the policy-based component handles time conditions. The procedure includes the following. In block 901, the policy adapter collects from the local repository all the component-specific abstractions that are related to disseminate policies with valid time condition, if any, or for which the component can handle the time conditions. In block 902, the policy adapter collects from the local repository all of the component-specific information received in the process of component deployment and which is related the component-specific abstractions selected in block 901. In block 903, the policy adapter combines the disseminated content with the content received at deployment time in a format that is appropriate for forwarding to the component. In block 904, the policy adapter executes the procedure for forwarding of component-specific policy.

Figure 16:
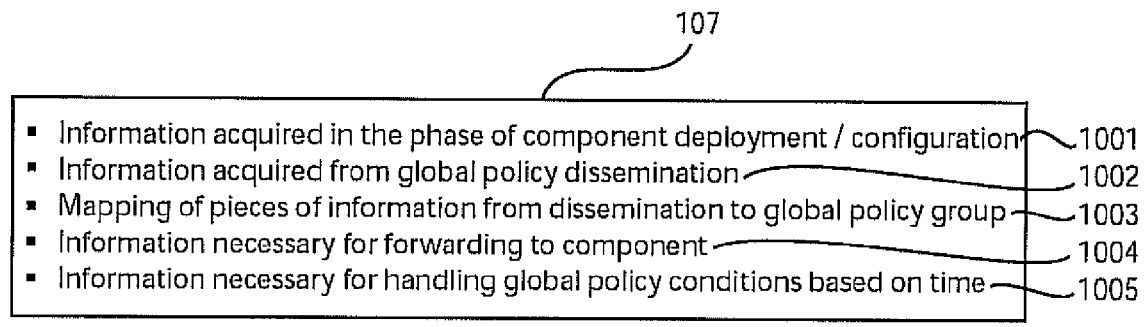
FIG. 16 is a block/flow diagram showing data structures maintained by a component-specific adapter in accordance with an illustrative embodiment.

In the process of handling policy dissemination requests received from the policy distributor 120 (FIG. 12), the policy adapter 107 (FIG. 12), maintains several specific data structures. FIG. 16 illustratively identifies some of these data structures which may be maintained by policy adapter 107. The data structures may include information 1001 acquired in the phase of component deployment and configuration, that is to be combined with the global policy content to create component-specific policy. Also, the data structures may include information 1002 acquired through global policy dissemination mapping of pieces 1003 of information extracted from the global policy content to the policy group 102, and related global policy 103. Also, the data structures may include information 1004 necessary for forwarding component-specific policy. For example, this information should describe the service and host where to forward the document. The data structures may also include information 1005 necessary for handling global policy conditions based on time. For example, if the policy-based component is not able to handle the timing conditions, the adapter has to keep track of all of the timing conditions. When a policy's timing condition becomes valid, the adapter creates and forwards the related component-specific policies. If the policy-based component can handle timing conditions, the adapter forwards specific-policy content upon the receipt of the dissemination request.

Resource Arbitration for Multiple Business Models

Figure 17:
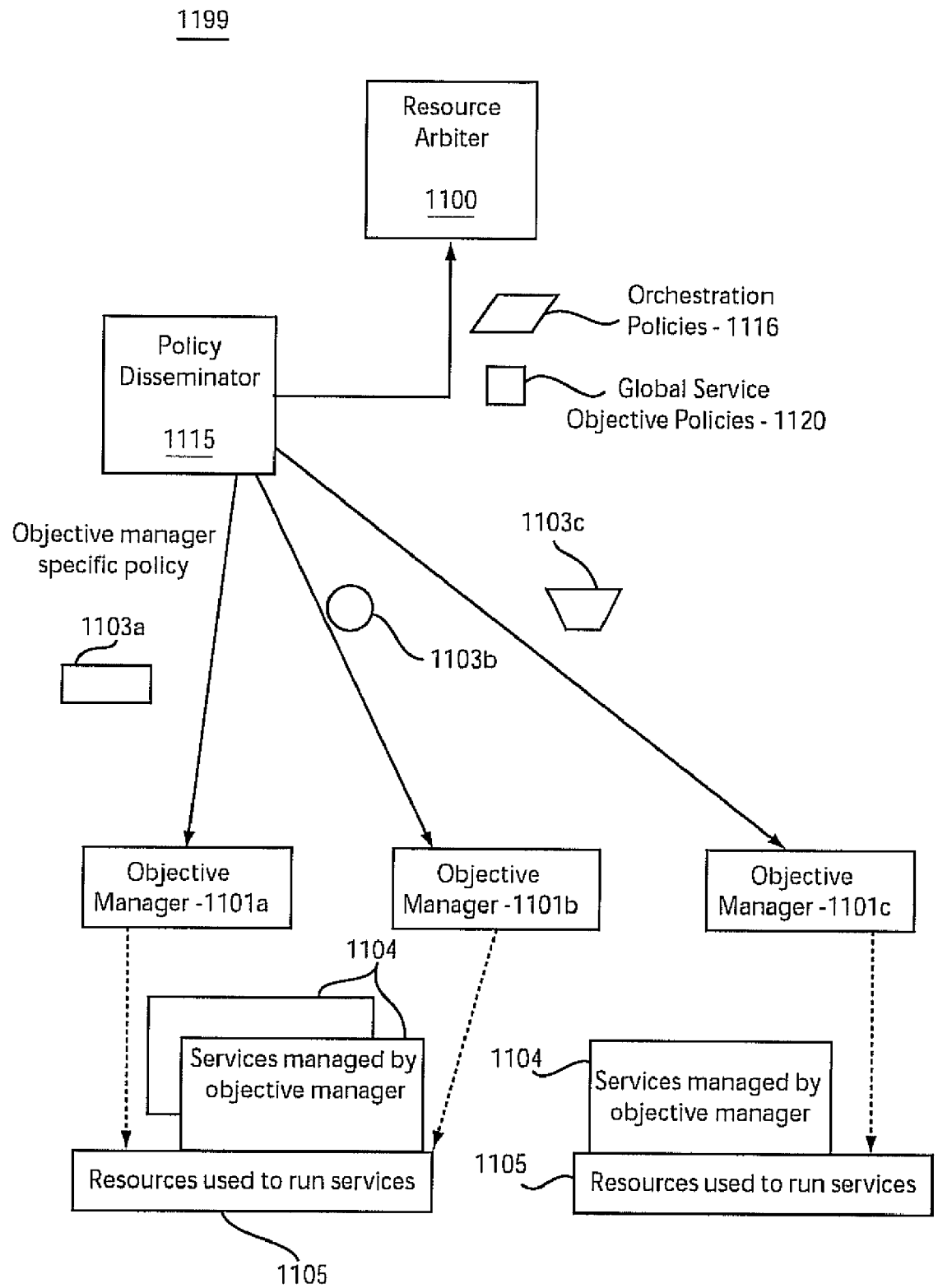
FIG. 17 is a block/flow diagram showing architecture of a system with a resource arbiter using disseminated global service objectives in accordance with an illustrative embodiment.

Referring to FIG. 17, a system architecture 1199 of an enterprise computing infrastructure including a resource arbiter 1100 that uses global service objectives is illustratively shown. The system 1199 comprises multiple services 1104 each running on top of a set of assigned resources 1105. The services 1104 are managed by objective manager components 1101a-1101c according to a set of specific service objective policies 1103a-1103c. More managers can manage the same service, each managing disjoint subsets of objectives 1101 related to the service.

The system 1199 includes a resource arbiter component 1100, which determines how the enterprise resources 1105 are assigned to specific services 1104 to satisfy enterprise-service objectives and maximize the value accrued from these objectives.

The resource arbiter 1100, and objective managers 1101 receive the specification of service objectives and other policy that are needed for performing their functions from a policy disseminator 1115. The policy disseminator 1115 filters the enterprise service policy based on the roles of each component and policy types, transforms, if necessary, the enterprise service policy to component-specific policy, and forwards these policies to objective managers 1101.

The resource arbiter 1100 receives from the policy disseminator 1115, the enterprise service objective policies, also called global service objective policies 1120 and orchestration policies 1116. The objective managers receive the global service objective policies 1120 that are related to the services the managers manage and the manager's roles. From these objectives 1120, the objective managers 101a-1101c derive the specific objectives they manage 1103a-1103c. The derivation may be done based on manager-specific rules and system-level objectives. For instance, a manager can use specific rules for aggregation of multiple similar enterprise service objective policies into a single specific objective for improving the scalability of his management procedure. Also, a manager can use system-level objectives for transforming the business value of enterprise service objectives into the manager-specific objective value model, for instance from penalty expression to importance value in range 1 to 99.

Figure 18:
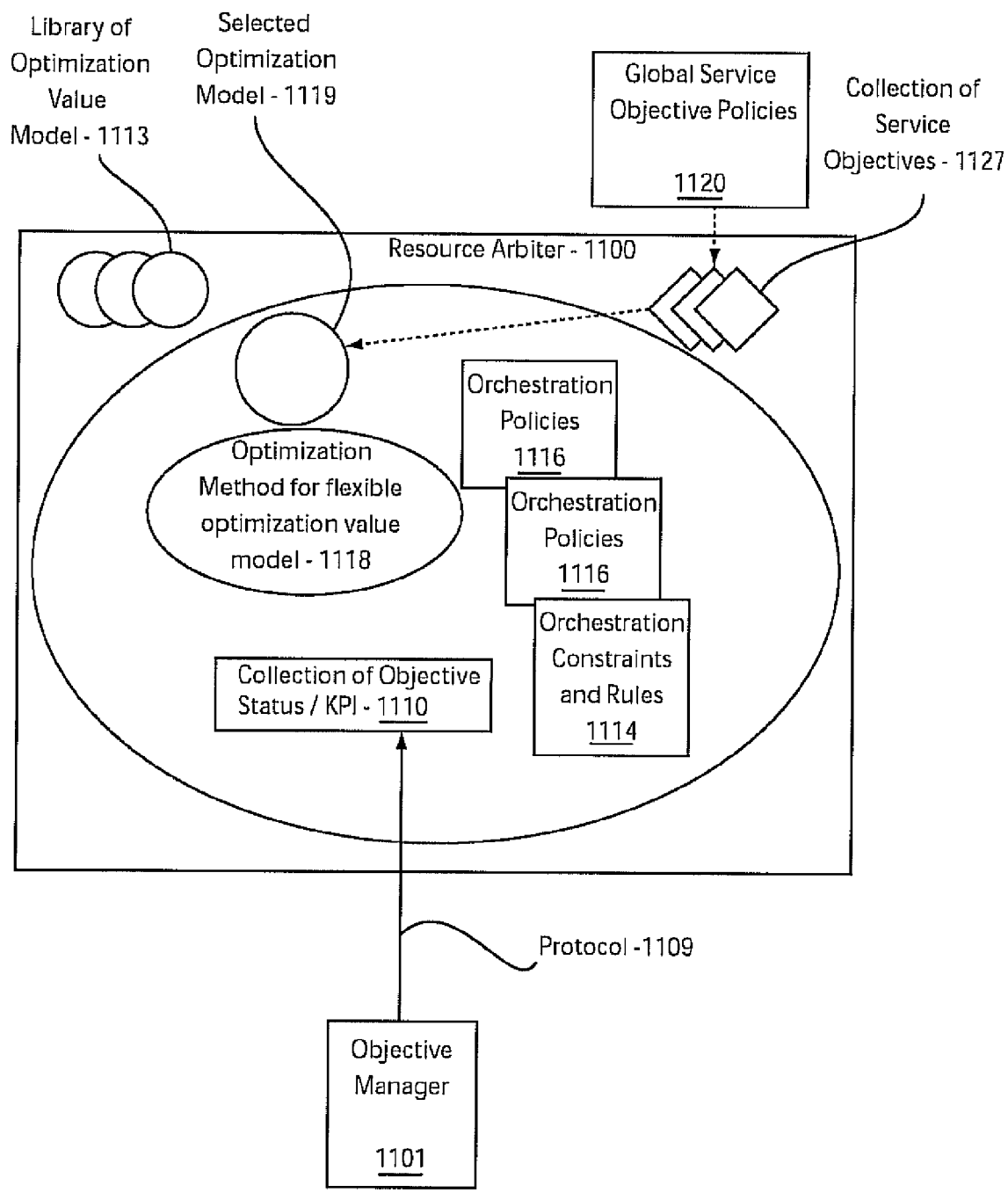
FIG. 18 is a block/flow diagram showing architecture of a resource arbiter decision framework with runtime selection of value models for identification of an optimum provisioning state in accordance with an illustrative embodiment.

Referring to FIG. 18, architecture of a resource arbiter decision framework is further illustrated, where the arbitration decisions use runtime selection of the models for identification the optimum provisioning state. The resource arbiter 1100 uses the global service objective policies 1120 to extract a collection 1127 of service objective policies 103 (e.g., see FIG. 4) that are used by all of the objective managers 1101, in the system.

Figure 19:
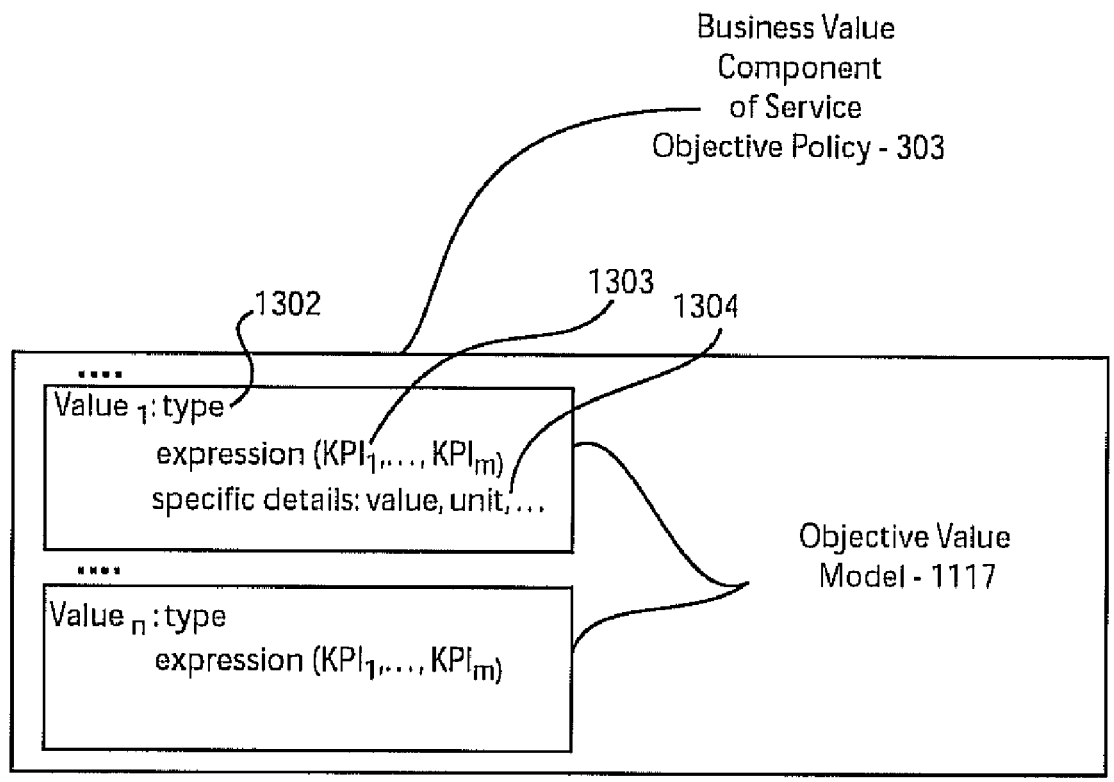
FIG. 19 is a block/flow diagram showing components of a service objective model in accordance with an illustrative embodiment.

Referring to FIG. 19 with continued reference to FIG. 18, a business value component 303 (FIG. 2) of a global service objective policy 103 (FIG. 4) includes one or more value models 1117. Each objective value model 1117 is identified by a type 1302 and an expression 1303. The value expression 1303 is a function of zero or more service Key Performance Indicators, KPIs. Also, the value model can include specific components 1304, such as the value unit. For example, sample objective value models may include importance and penalty. The expression associated with importance may be a constant. The expression associated with penalty may be a function of the measured and target average response time KPI with a value unit that can be dollars or cents. For the same value model type, different objectives can have different expressions. For example, an objective related to availability has the penalty expression defined in terms of the 'Accumulated Downtime' KPI while an objective related to performance, has the penalty expression defined in terms of the "Average Response Time" KPI.

From orchestration policy 1116, the resource arbiter 1100 extracts orchestration constraints and rules 1114, that it uses in driving its decision making process. The orchestration policy 1116 can define additional objective value models to be used along with the models specified by enterprise service objectives for assessing the enterprise-level value of the various provisioning states analyzed during a decision making process. A sample objective model defined by orchestration policy 1116 may include the "probability of objective failure", which assess how likely it is for a specific service objective to be missed. The expressions associated to value models defined by orchestration objectives are the same, across all objectives.

The optimization method 111B, used by the resource arbiter 1100, uses a set of methods for assessing the value of a provisioning state, called 'optimization value model', 1119, which it selects and loads at runtime from a library of optimization value models 1113.

The optimization value model 1119 is selected based on orchestration policies 1116, and the value models of the current service objectives 1127. The methods of the orchestration model compute the value of a provisioning state by aggregating the values obtained by evaluating the value model expressions 1303 of the service objectives in collection 1127. The value model expressions 1303 are evaluated using KPI values from the collection of objective status and KPI values 1110 maintained by the arbiter. The information in this collection is provided by objective managers 1101 through specific protocol 1109 for acquisition of information on objective status and service KPIs. An example acquisition protocol is based on a pull model, where the resource arbiter queries objective managers 1101 for new information. An alternative embodiment includes a push model, in which objective managers forward new information as information becomes available. Another alternative embodiment includes a mixed push and pull model.

Figure 20:
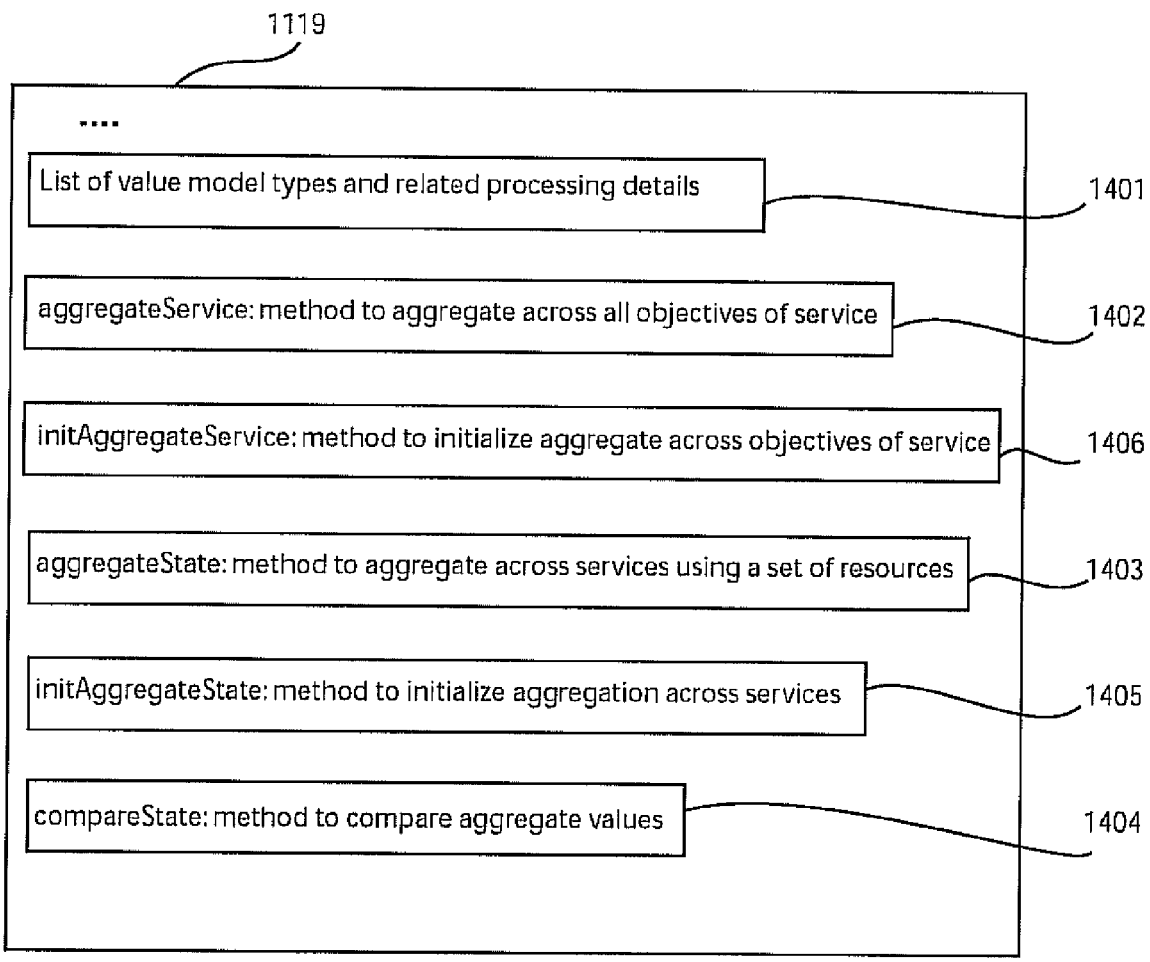
FIG. 20 is a block/flow diagram showing components of an optimization value model in accordance with an illustrative embodiment.

Referring to FIG. 20, main components of an optimization value model 1119 are illustratively shown. The optimization value model 1119 comprises a list 1401 of value model types, a method for aggregation 1402 across all objectives of a service, a method for aggregation 1403 across the set of services and a method for comparison 1404 of aggregate values. The list 1401 of value model types may include, for each type, additional processing details, such as the value unit to use in the aggregation methods across all of the objectives. The method for aggregation 1402 across all objectives of a service encompasses objectives managed by different objectives managers. The method 1402 takes as input the actual objective KPIs and values computed based on the objective-specific expressions 1302. The value produced by the method has a type specific to the optimization value model. The method for aggregation 1403 across a set of services takes as input the value produced by method 1402. The method 1403 is used to produce a value for a provisioning state analyzed in the processes of the arbitration decision. The value produced by the method 1403 has a type specific to the optimization value model, and can be different than the output type of method 1402. The method for comparison 1404 of aggregate values is used to compare two values produced by different invocations of method 1403, such as corresponding to two different provisioning states. The output of the method 1404 is an integer indicating which of the two values is larger. In addition to these methods, the optimization value model includes methods for initialization of state-level and of service-level aggregates 1405 and 1406, respectively.

In an alternative embodiment, the method 1402 can be replaced by a method to aggregate across the objectives of a service managed by an objective manager, and a method for aggregation across the aggregate values for a service that is produced by different objective managers. Also, in an alternative embodiment, a method for aggregation of partial service-level aggregates can be defined, with an input of a set of aggregates of subsets of objectives for the same service, called partial aggregates, and produce a service level aggregate as the method 1402. A partial aggregate can be produced by invoking, e.g., 'aggregateService' 1402 with a subset of the objectives associated with a service, such as the subset corresponding to an objective manager 1101.

A sample optimization value model 1119 may be defined by a value model type of importance and probability of objective breach, and may include methods that aggregate the values such that, for each importance level, the method highlights the maximum probability of objective across all objectives with the same importance. This optimization value model enables arbitration decisions that minimize the importance level for which objectives are likely to fail, and thus support a guarantee-based enterprise service model. Another sample optimization value model 1119 uses the same value model types, importance and probability of objective breach, and aggregation methods that use a specific function to scale probability of breach with importance. This optimization value model enables arbitration decisions that support a best-effort enterprise service model with bias towards objectives of higher importance.

Figure 21:
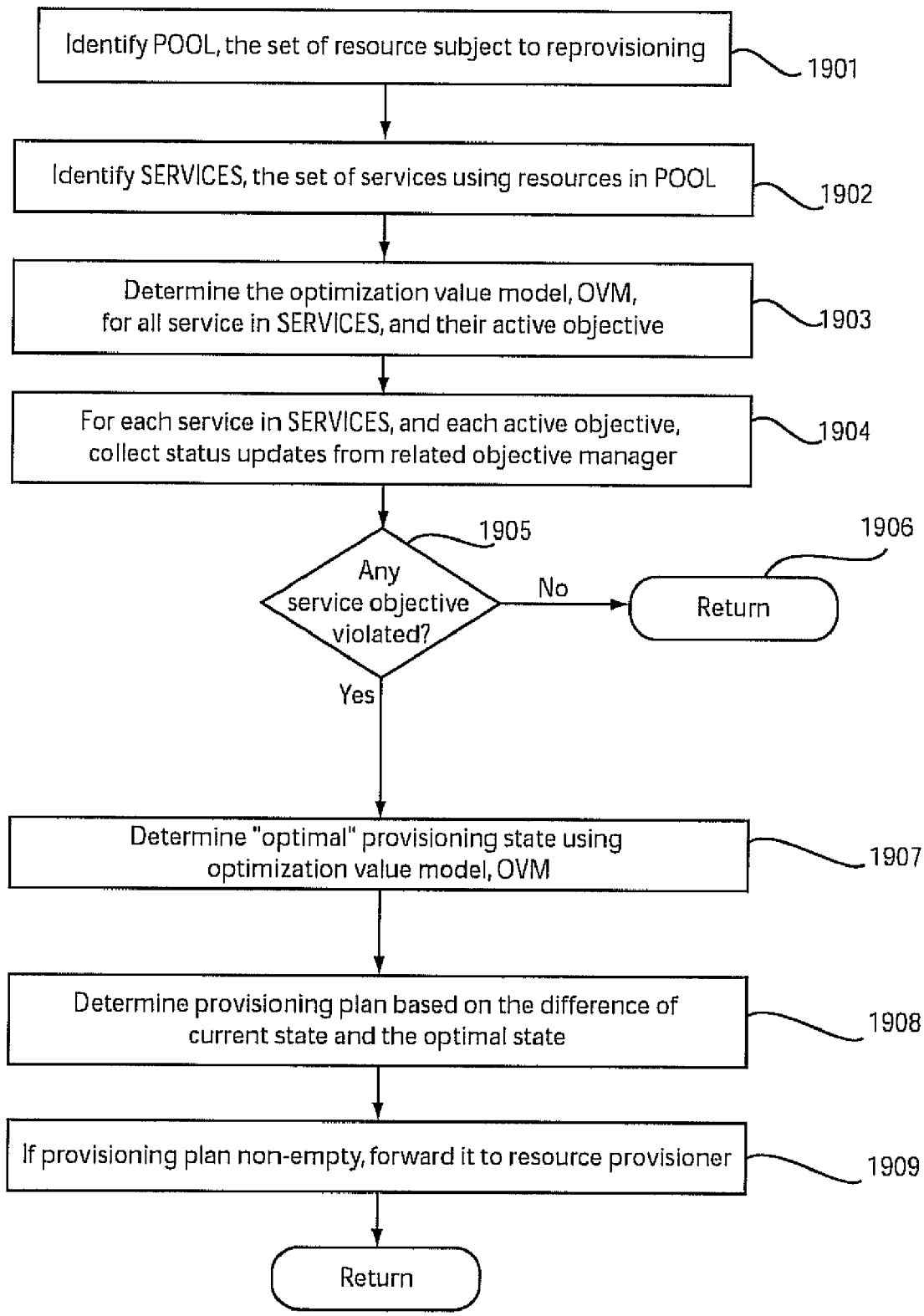
FIG. 21 is a block/flow diagram showing a process of making a resource arbitration decision in accordance with an illustrative embodiment.

Referring to FIG. 21 with continued reference to FIGS. 17, 18 and 19, a block/flow diagram for making a resource arbitration decision is illustratively shown. The procedure starts by identifying a set of resources 1105, which are a subject of a possible re-provisioning action in block 1901. For example, the set of resources may correspond to a pool of similar resources used to run multiple computing services. Further, in block 1902, the resource arbiter 1100 identifies the set of services 1104 that use resources in the set identified in block 1901. In block 1903, the resource arbiter 1100 determines the optimization value model (OVM) 1119 to be used in current arbitration decision based on the identified services and their active objectives 1120. (An active objective is a service objective that is being enforced at the time of the decision; throughout the lifetime of a service objective policy, due to policy conditions 303, objectives can be active or non-active.)

Further, in block 1904, for each service and its active objectives 1120, the resource arbiter 1100 collects objective status updates 1109 from the related objective managers. The resource arbiter 1100 checks if any objective is violated in block 1905. If no objective is violated, the arbitration decision is completed in block 1906 with an empty provisioning plan. If there are violated objectives, the resource arbiter 1100 determines the "optimal" provisioning state in block 1907. The meaning of "optimal state" depends on the currently used optimization value model 1119.

In block 1908, the resource arbiter 1100 determines the provisioning plan 1106, which transfers the system from the current provisioning state into the state determined by block 1907. In block 1909, if the provisioning plan 1106 is non empty, the resource arbiter 1100 forwards the plan to a resource provisioner 1107, which executes the plan through a sequence of provisioning operations 1108 related to resources 1105, services 1104, objective managers 1101, and other components in the system. The provisioning plan is empty if current state is determined to be the "optimal state". In an alternate embodiment, rather than returning when no objective is violated, in block 1906, the resource arbiter can attempt to determine another provisioning state that provides a better value to the enterprise.

Figure 22:
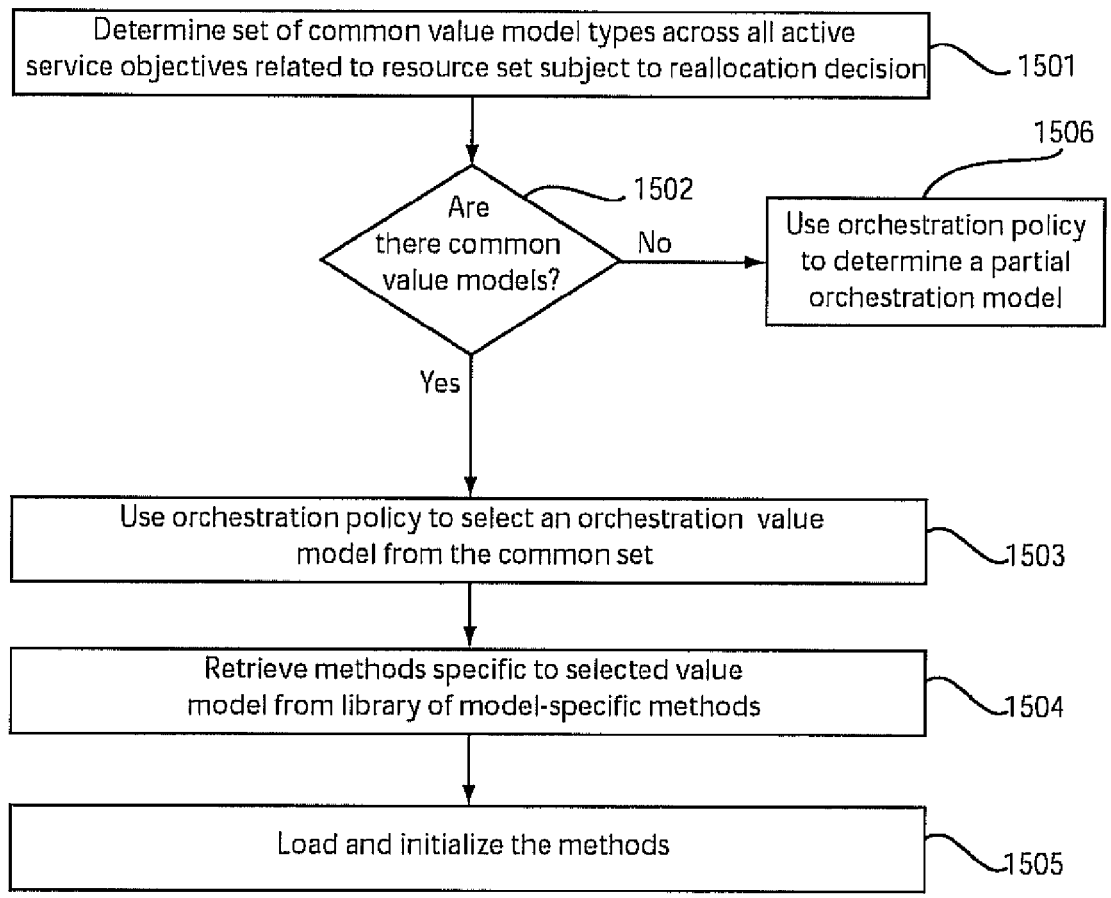
FIG. 22 is a block/flow diagram showing a procedure for selecting the optimization value model to use in the arbitration decision in accordance with an illustrative embodiment.

Referring to FIG. 22 with continued reference to FIGS. 17, 18 and 19, a block/flow diagram of a procedure for selecting the optimization value model (OVM) 1119, which corresponds to step 1903 on FIG. 21 is illustratively shown. In block 1501, the procedure determines the set of common types of objective value models 1117, across all of the active service objectives of the services related to the resource set subject to the arbitration decision. If there is a set of common types of objective value models, in block 1503, the procedure uses orchestration policy to select an orchestration value model 1119, that all of part of the common types in block 1503. Otherwise, in block 1506, orchestration policy is used to determine an orchestration value model 1119, which uses a set of value model types that are common only to a subset of the active objectives. This orchestration value model has aggregation functions that can handle objectives that miss the expected value model types. Either way, in block 1504, the procedure retrieves the specification of the optimization value model from the library 1113. In block 1505, the procedure loads and initializes the aggregation methods of the model 1119. The initialization can use specific parameters or properties specified by optimization policy. In an alternative embodiment, if the common set of value models is the same as that used at the previous decision, the procedure returns after block 1501. The analysis performed in block 1501 for determining a common set of objective value model types can be performed by traversing the entire set of objectives, analyzing each value model and collecting the common types. In an alternative embodiment, block 1501 can retrieve the set of common value model types for the resource pool which is updated by the arbiter for the resource pool any type an objective related to the pool is activated or deactivated.

Figure 23:
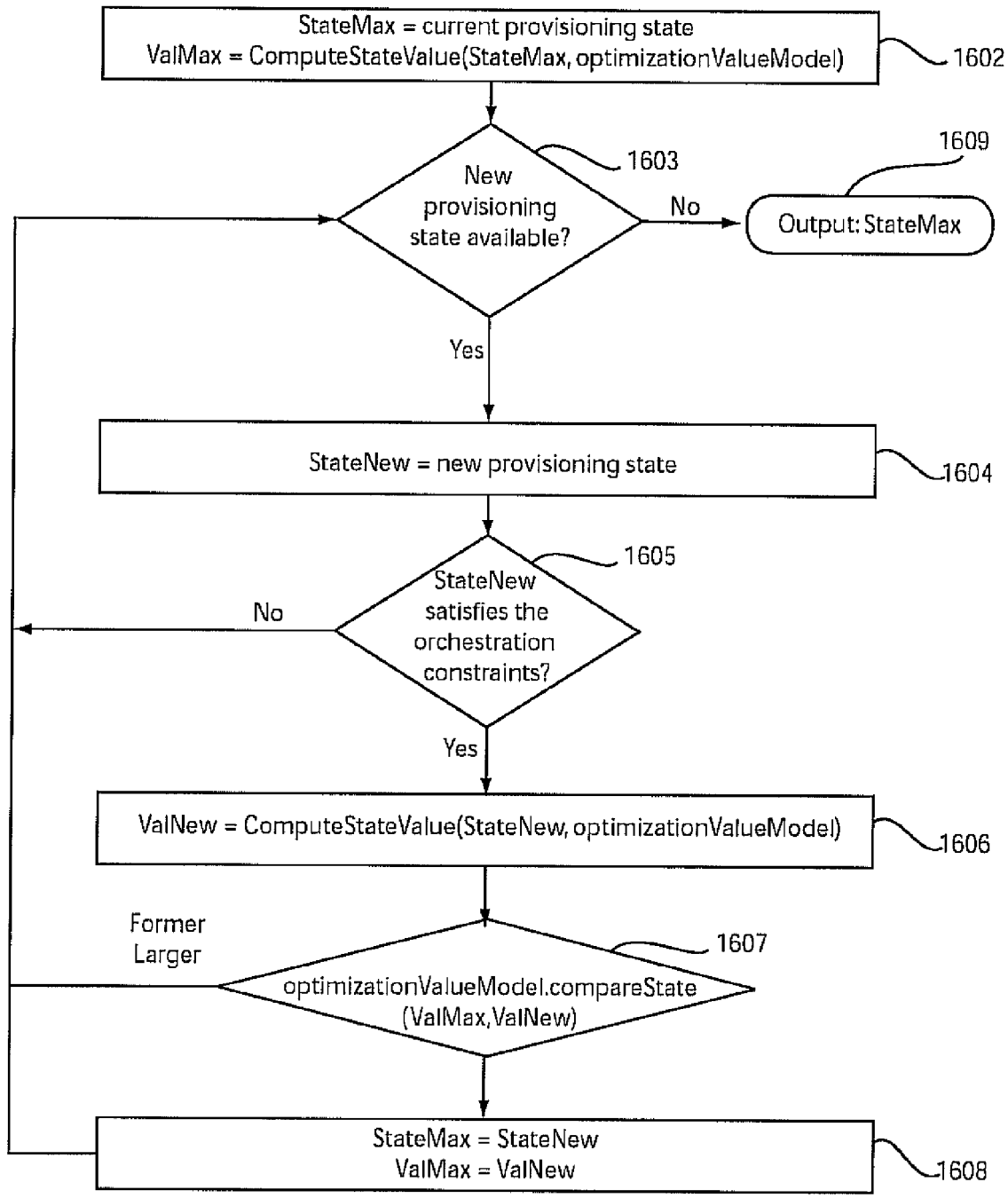
FIG. 23 is a block/flow diagram showing a procedure for finding an optimal provisioning state in accordance with an illustrative embodiment.

Returning to FIG. 21, the process of making a resource arbitration decision in block 1904 for determining the optimal provisioning state using an optimization value model is detailed by the flow diagram in FIG. 23.

Referring to FIG. 23, the procedure takes as parameters the optimization value model 1119, and state descriptor including information about resources, services, objectives and objective manager descriptors. The procedure uses two variables: StateMax that represents the provisioning state with the best value according to the currently optimization value model, and ValMax that represents the value of StateMax computed using the methods of the optimization value model.

In block 1602, the procedure sets StateMax to identify the current provisioning state, and computes ValMax using a procedure for computing the value of a provisioning state, henceforth called ComputeStateValue. This procedure is illustratively shown in FIG. 24 and uses the methods of the optimization value model. Further, in block 1603, the procedure attempts to generate a new provisioning state. If no new provisioning state can be generated, in block 1609, the procedure returns the provisioning state currently identified by StateMax. Otherwise, in block 1604, the new provisioning state is identified as StateNew.

In block 1605, it is checked whether StateNew satisfies the orchestration constraints 1114. If it does not, the procedure returns to step 1603, the generation of a new provisioning state. Otherwise, in block 1606, the value of StateNew is computed using the procedure called ComputeStateValue, and this value is assigned to variable ValNew. Further, in block 1607, the ValMax and ValNew are compared with the optimization value model method 'compareState' 1404 (FIG. 20). If ValMax is lower, in block 1608, StateMax is set to represent StateNew and ValMax is replaced with ValNew. In an alternative embodiment, the method can take as a parameter an initial provisioning state rather than using the current state as the initial state.

Figure 24:
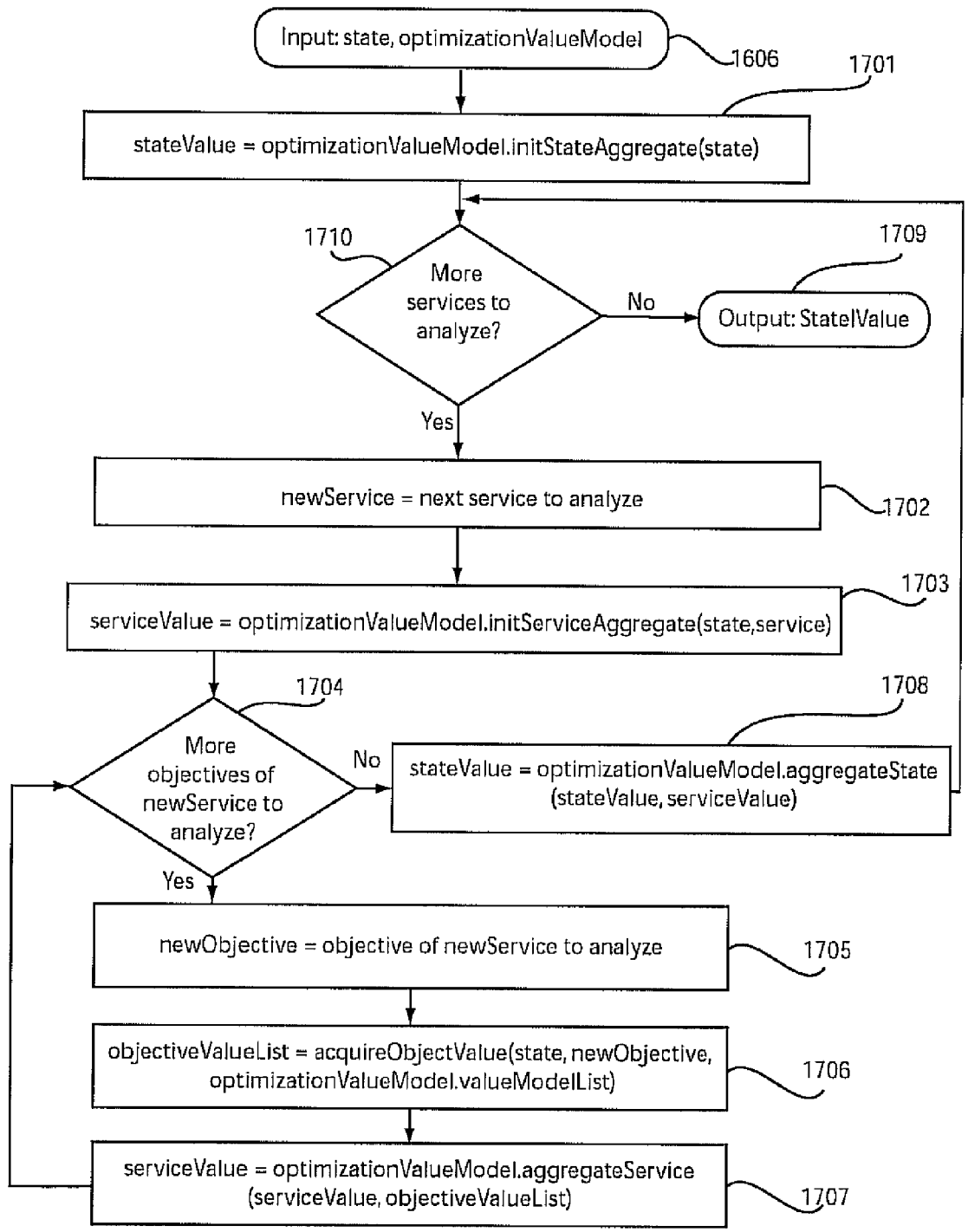
FIG. 24 is a block/flow diagram showing a procedure for computing the value of a provisioning state in accordance with an illustrative embodiment.

Referring to FIG. 24, a block/flow diagram of a procedure for computing the value of a provisioning state based on the methods of the optimization value model is illustratively shown. This procedure is used in blocks 1602 and 1606 in FIG. 23, and labeled 'ComputeStateValue'. The procedure input includes a state descriptor for the provisioning state for which the value has to be computed and the optimization value model 1119, selected for the current arbitration decision. The procedure uses the local variable 'stateValue' to aggregate the value of the provisioning state. In block 1701, 'stateValue' is initialized by invoking the 'initStateAggregate' method, 1405 (FIG. 20) of the optimization value model 1119. For all of the services related to the provisioning state, in block 1710, the procedure performs blocks 1702-1708.

In block 1702, the procedure identifies a new service to analyze. In block 1703, the procedure invokes the method 'initServiceAggregate' in block 1406 (FIG. 20), of the optimization value model 1119 to initialize the aggregation of objective values related to the service currently analyzed. For all of the objectives of the currently analyzed service, in block 1704, the procedure identifies a new objective to analyze in block 1705, acquires the objective values, for all of the value model types associated in block 1401 (FIG. 20), with the optimization value model 1119. In block 1707, the values associated with the objectives are added to the service-level aggregate, by invoking the method 'aggregateService', 1402 (FIG. 20) of the optimization value model 1119.

After all objectives of the analyzed service are processed, in block 1708, the current service value is aggregated into the state value, represented by variable 'stateValue', by invoking the method 'aggregateState', 1404 (FIG. 20) of the optimization value model 1119. After all services are analyzed, the procedure returns the value of 'stateValue', which has a type specific to the optimization value model 1119. For the acquisition of objective values performed in block 1706, FIG. 25 presents a flow diagram.

Figure 25:
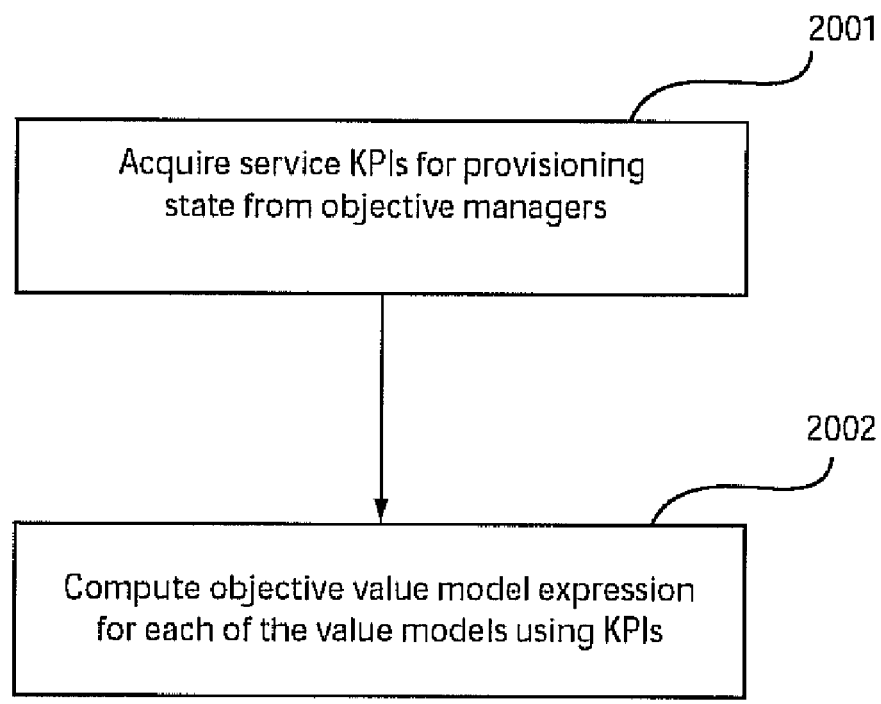
FIG. 25 is a block/flow diagram showing a process of acquisition of objective values in accordance with an illustrative embodiment.

Referring to FIG. 25, in block 2001, the procedure acquires the values of service KPIs for the provisioning state being analyzed. In block 2002, the procedure evaluates the value model expressions (1303 in FIG. 19) based on the KPI values acquired in block 2001. The acquisition can be performed through a request issued by the resource arbiter 1100 to the objective manager component 1101 that indicates the provisioning state being analyzed and the KPIs related to the expressions 1303 of the objective value models considered by the currently selected optimization value model 1119. In an alternative embodiment, the acquisition can be performed by extraction of the KPI values of interest from a batch of KPI values computed for multiple provisioning states, and provided by the objective manager component 1101 sometime in the past. The objective manager components 1101 can compute and send such batches of KPI values upon detecting relevant changes in the state of the managed services.

Figure 26:
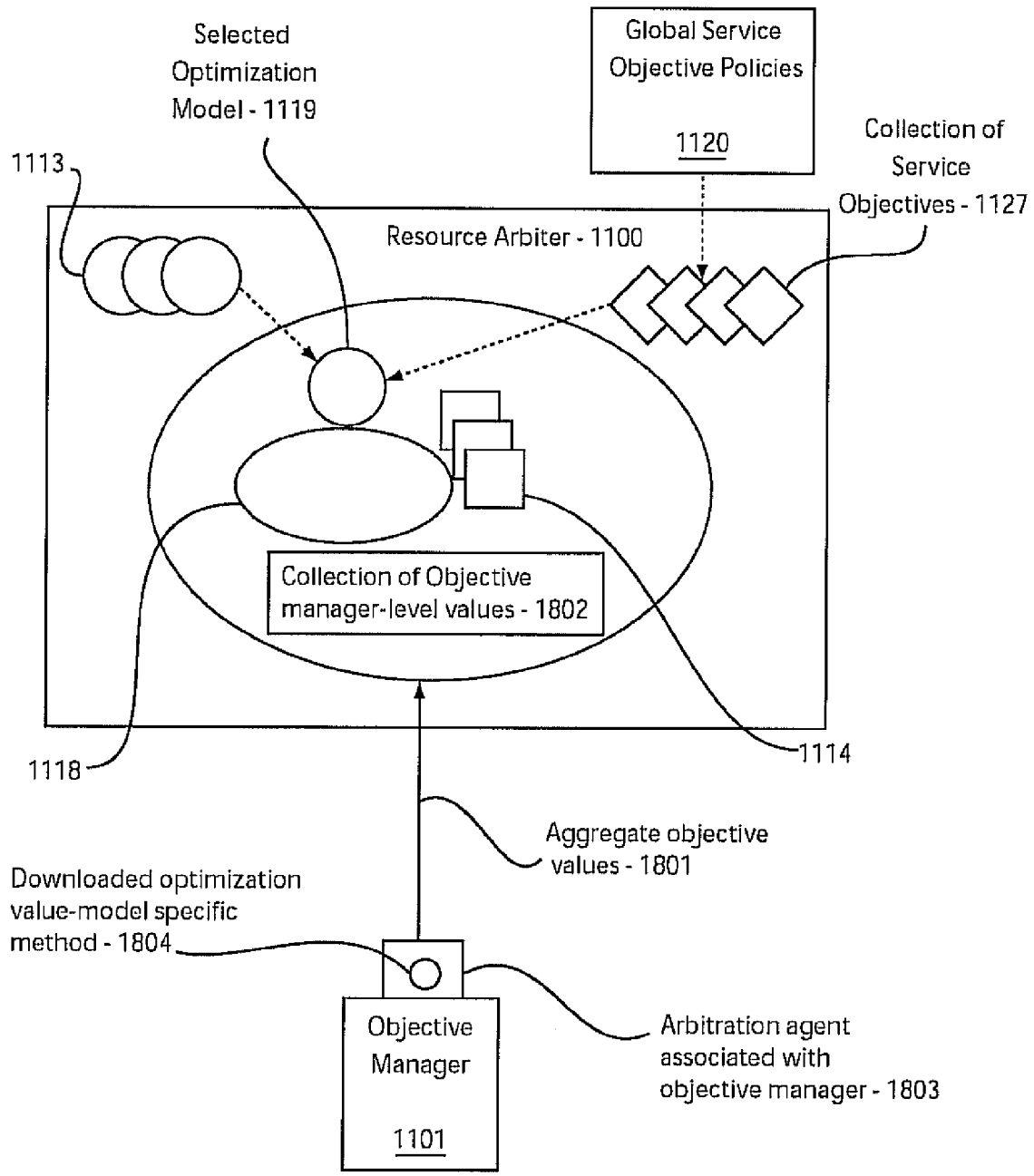
FIG. 26 is a block/flow diagram showing architecture for distributed evaluation of provisioning-state values in accordance with an illustrative embodiment.

Referring to FIG. 26, components of an alternative embodiment are shown wherein the computation of provisioning state value (see blocks 1602 and 1606 in FIG. 23) is performed in a distributed approach. In addition to the basic architecture described in FIG. 18, an objective manager 1101 may be associated with an arbitration agent 1803; some objective managers 1101 might have associated arbitration agents 1803 while some objective managers 1101 might not. The arbitration agent interacts with the resource arbiter to learn about selected optimization value model 1119 and to download, if necessary, related methods 1804. The distributed resource arbiter component 1803 can compute on request or proactively, partial aggregates for each of the managed services. The aggregate can be computed using the methods 'initServiceAggregate' (1406) and 'serviceAggregate' (1402) applied to the objectives managed by the objective manager 1101. The arbitration agent 1803 can locally compute the steps for acquisition of objective value as described above, and can send, proactively or upon request, the aggregates it computes. These values are collected by the resource arbiter 1100 in a collection of aggregate objective values 1802 and are used in the process of computation of a provisioning state value by replacing blocks 1705 and 1706 (FIG. 24) with the acquisition of a partial service value aggregate, and replacing block 1707 with the invocation of a method of the optimization value model for aggregation of partial service aggregates across objective managers.

In an alternative embodiment, the resource arbiter can be collocated with the policy disseminator. The arbitration agents 1803 associated with objective managers 1101 can perform the transformation of global service objective policies 1120 to manager-specific objectives 1103.

Having described preferred embodiments of a system and method for automated dissemination of enterprise policy for runtime customization of resource arbitration (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for disseminating policies to multiple policy-based components, comprising:
    a policy producer, stored on a computer-readable storage medium, which generates a group of policies to be enforced; and
    a policy disseminator configured to classify each policy with a type, and for each policy type, the policy disseminator is configured to identify policy-based components that handle a corresponding policy type, the policy disseminator configured to send specific policy types from the group of policies to each policy-based component that can handle that specific policy type.

2. The system as recited in claim 1, wherein the policy-based components are identified in accordance with one or more functional roles that the component performs and each functional role is associated with one or more types of policies that the component can handle.

3. The system as recited in claim 2, wherein the functional roles, the associations of components to functional roles, and/or associations of types to roles are defined at runtime.

4. The system as recited in claim 1, wherein a policy: identifies a managed service or resource elements with which a policy is associated, identifies a desired state of a service or resource of business importance for achieving a desired state, and/or identifies a condition that must be met for a desired state to be applicable.

5. The system as recited in claim 1, wherein a set of the policies used in the management of a policy-based component is derived from one or more groups of policies disseminated by one or more policy disseminator.

6. The system as recited in claim 1, wherein one of the policy-based components comprises a specialized module that combines and transforms the policies received from the policy disseminator and other pieces of information into component-specific policy descriptors.

7. The system as recited in claim 1, wherein the policy disseminator associates the group of policies with a dissemination protocol and uses the dissemination protocol to disseminate the policies in the group to the policy-based components.

8. The system as recited in claim 1, wherein the policy types or associations of types with policy-based components that handle the types or associations are defined at runtime.

9. The system as recited in claim 1, wherein the policies do not reference any deployment or configuration information regarding policy-based components.

10. A method for disseminating policies to multiple policy-based components, comprising:
   generating with a processor a group of policies to be enforced; and
   disseminating the policies wherein each policy is classified with a type, and for each policy type, a policy disseminator identifies policy-based components that handle a corresponding policy type, the policy disseminator sending specific policy types from the group of policies to each policy-based component that can handle that specific policy type.

11. The method as recited in claim 10, wherein the policy-based components are identified in accordance with one or more functional roles that the component performs and each functional role is associated with one or more types of policies that the component can handle.

12. The method as recited in claim 11, wherein the functional roles, the associations of components to functional roles, and/or associations of types to roles are defined at runtime.

13. The method as recited in claim 10, wherein a policy: identifies a managed service or resource elements with which a policy is associated, identifies a desired state of a service or resource of business importance for achieving a desired state, and/or identifies a condition that must be met for a desired state to be applicable.

14. The method as recited in claim 10, wherein a set of the policies used in the management of a policy-based component is derived from one or more groups of policies disseminated by one or more policy disseminator.

15. The method as recited in claim 10, wherein one of the policy-based components comprises a specialized module, and further comprising the steps of combining and transforming the policies received from the policy disseminator and other pieces of information into component-specific policy descriptors using the special module.

16. The method as recited in claim 10, wherein the associating the group of policies with a dissemination protocol and using the dissemination protocol to disseminate the policies in the group to the policy-based components.

17. The method as recited in claim 10, wherein the policy types or associations of types with policy-based components that handle the types or associations are defined at runtime.

18. The method as recited in claim 10, wherein the policies do not reference any deployment or configuration information regarding policy-based components.

19. A computer program product for disseminating policies to multiple policy-based components, comprising a computer-readable storage medium including a computer readable program, wherein the computer readable program when executed on a computer causes the computer to perform the method steps of:
   generating a group of policies to be enforced; and
   disseminating the policies wherein each policy is classified with a type, and for each policy type, a policy disseminator identifies policy-based components that handle a corresponding policy type, the policy disseminator sending specific policy types from the group of policies to each policy-based component that can handle that specific policy type.

* * * * *